US012803973B2

(12) United States Patent
Chen et al.

(10) Patent No.: US 12,803,973 B2
(45) Date of Patent: Nov. 17, 2026

(54) AUDITED, CLIENTLESS, JUST IN TIME ACCESS TO PROTECTED RESOURCES TO ENHANCE SECURITY

(71) Applicant: Palo Alto Networks, Inc., Santa Clara, CA (US)

(72) Inventors: Ju Song Chen, Pleasanton, CA (US); Venkata Naga Srinivas Kumar Karavadi, Mountain House, CA (US); Sindhu Payankulath, Reno, NV (US)

(73) Assignee: Palo Alto Networks, Inc., Santa Clara, CA (US)

( * ) Notice: Subject to any disclaimer, the term of this patent is extended or adjusted under 35 U.S.C. 154(b) by 148 days.

(21) Appl. No.: 18/592,351

(22) Filed: Feb. 29, 2024

(65) Prior Publication Data

US 2025/0279991 A1 Sep. 4, 2025

(51) Int. Cl.
*H04L 9/40* (2022.01)

(52) U.S. Cl.
CPC .......... *H04L 63/083* (2013.01); *H04L 63/105* (2013.01); *H04L 63/20* (2013.01)

(58) Field of Classification Search
CPC ...... H04L 63/083; H04L 63/105; H04L 63/20
USPC .............................................................. 726/4
See application file for complete search history.

(56) References Cited

U.S. PATENT DOCUMENTS

| | | | | |
|---|---|---|---|---|
| 8,850,526 | B2 | 9/2014 | Jayaraman | |
| 9,465,753 | B2 | 10/2016 | Zbiciak | |
| 9,530,020 | B2 * | 12/2016 | Brandwine | G06F 21/6218 |
| 10,021,108 | B2 | 7/2018 | Mankovskii | |
| 11,797,703 | B1 | 10/2023 | Lim | |
| 2017/0257363 | A1 * | 9/2017 | Franke | H04W 12/069 |
| 2018/0247483 | A1 | 8/2018 | Lindsay | |
| 2024/0045997 | A1 | 2/2024 | Volos | |
| 2025/0245311 | A1 * | 7/2025 | Hassard | H04L 9/3213 |

* cited by examiner

*Primary Examiner* — Aubrey H Wyszynski
(74) *Attorney, Agent, or Firm* — Van Pelt, Yi & James LLP

(57) ABSTRACT

A method, system, and device for managing just-in-time access to a protected resource(s). The method includes (i) receiving from a user a request for access permission for the protected resource, (ii) prompting an administrator of the protected resource to process the request for access permission, (iii) receiving from the administrator an instruction for processing the request for access permission, and (iv) in response to determining that the instruction for processing the request is to grant access, granting the user access to the protected resource.

22 Claims, 21 Drawing Sheets

900

III COLUMNS ≡ DENSITY

FILTERS | All Time

| Start time (905) | Status (910) | Query text (915) | Environment (920) | Sql statements kind (925) | Resource id (930) | Row count (935) | Duration ms (940) |
|---|---|---|---|---|---|---|---|
| Feb 5, 2024 1:21:34.874 PM | finished | select salt_profile from instance_ master where id=1298 | cyrus-prod4 | read_only | aws:rds:cyrus-prod4 | 1 | 15 |
| Feb 5, 2024 1:19:22.997 PM | finished | select * from cust_machine_type_ capacity_table where custid=26 | cyrus-prod4 | read_only | aws:rds:cyrus-prod4 | 11 | 17 |
| Feb 5, 2024 1:19:16.419 PM | finished | select * from saas_agent_mapping where saas_agent_version like "%5. | cyrus-lab | read_only | aws:rds:cyrus-lab | 1 | 19 |
| Feb 5, 2024 1:16:36.685 PM | finished | select * from saas_agent_mapping where saas_agent_version like "%5. | cyrus-prod5 | read_only | aws:rds:cyrus-prod5 | 0 | 12 |
| Feb 5, 2024 1:16:30.710 PM | finished | select Now() | cyrus-prod5 | read_only | aws:rds:cyrus-prod5 | 1 | 14 |
| Feb 5, 2024 1:16:14.800 PM | finished | select * from saas_agent_mapping where saas_agent_version like "%5. | cyrus-lab | read_only | aws:rds:cyrus-lab | 0 | 18 |
| Feb 5, 2024 1:15:31.028 PM | finished | select Now() | cyrus-lab | read_only | aws:rds:cyrus-lab | 1 | 20 |

FIG. 9A

AUDITED, CLIENTLESS, JUST IN TIME ACCESS TO PROTECTED RESOURCES TO ENHANCE SECURITY

BACKGROUND OF THE INVENTION

In the modern digital landscape, organizations rely extensively on databases and applications to store, process, and manage sensitive information critical to their operations. However, this dependence exposes these resources to various security risks, including unauthorized access, data breaches, and denial-of-service (DOS) attacks. Traditional security measures such as firewalls and access controls are often inadequate in providing comprehensive protection against evolving threats.

There is a growing need for innovative solutions capable of efficiently mediating traffic to safeguard protected resources from malicious activities while ensuring legitimate access for authorized users. Existing solutions often struggle to strike a balance between robust security measures and seamless accessibility, leading to either overly restrictive access policies that hinder productivity or vulnerabilities that compromise data integrity and confidentiality.

BRIEF DESCRIPTION OF THE DRAWINGS

Various embodiments of the invention are disclosed in the following detailed description and the accompanying drawings.

FIG. 9A is an example of a user interface configured for managing logged access events according to various embodiments.

DETAILED DESCRIPTION

Figure 1:
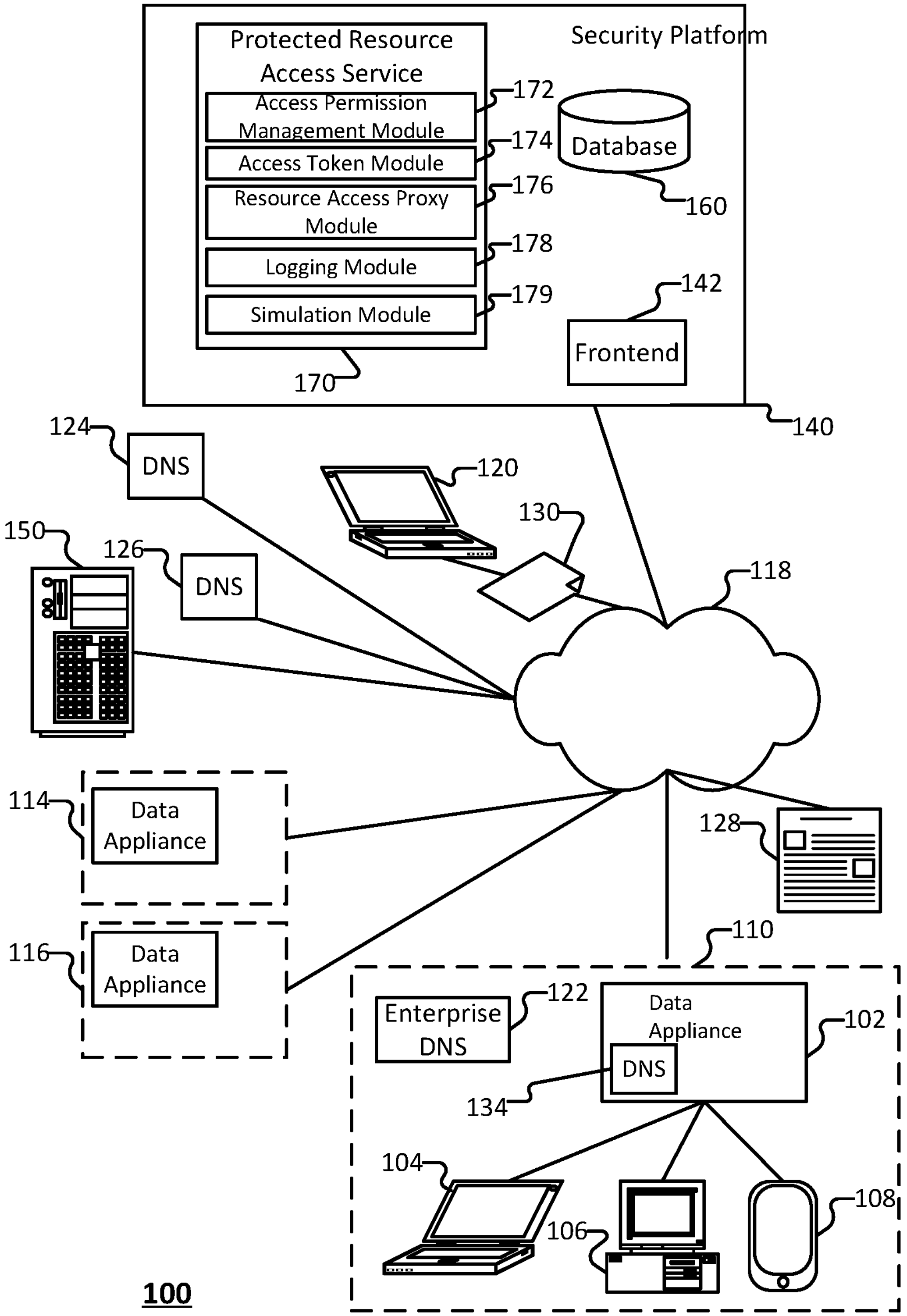
FIG. 1 is a block diagram of an environment for managing access to a protected resource according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a protected resource includes a resource for which access is controlled by a group of users that act as the administrator or owner of the protected resources. Examples of resources that may be configured to be a protected resource include a cluster of virtual machines (e.g., a Kubernetes cluster), a database, a web service, an application, a firewall (e.g., a firewall configuration or security policy to be enforced by a firewall) etc. Various other resources may be implemented.

Various embodiments provide a method, system, and device for managing just-in-time access to a protected resource(s). The method includes (i) receiving from a user a request for access permission for the protected resource, (ii) prompting an administrator of the protected resource to process the request for access permission, (iii) receiving from the administrator an instruction for processing the request for access permission, and (iv) in response to determining that the instruction for processing the request is to grant access, granting the user access to the protected resource.

Site reliability engineers (SREs) require access to production databases and various resources such as Kubernetes clusters, firewall instances, and MongoDB to fulfill assigned tasks. However, related art systems do not have well-established tools or services to precisely grant or revoke the appropriate privileges for these protected resources. Additionally, related art systems do not permit audit activities with respect to access events on these production resources.

Because current SRE tools/abstraction layers are insufficient for SRE's that are responding to incidents, SREs resort to direct database access, executing SQL queries to update or query production data to achieve their objectives. Unfortunately, such related art systems provide insufficient quality assurance for these direct database operations. This can result in service availability and quality issues. Furthermore, related art systems do not maintain audit records for manually applied data changes in production databases.

Related art systems require complex provisioning of user profiles and/or permissions to enable a user to access a protected resource. For example, users need to open an IT ticket and the user profile needs to be provisioned by a network administrator. The complexity of the permission provisioning adds significant delay in SREs management of protected resources. Additionally, because of the complexity in provisioning permissions, SREs often retain privileged database permissions for extended periods, raising security concerns.

Various embodiments provide a just-in-time access service that streamlines the permission request process and provides more effective permission management tools. The system allows users to submit requests via a web service and upon receipt of the permission request, the system invokes a review process to prompt a protected resource administrator/owner to review the permissions request and to provide an instruction of whether to approve/deny the permissions request. The system thus enables contemporaneous review and approval/denial of the permissions request. Additionally, the system enables users to define parameters for the grant of privileges, such as to define an expiry time for the grant of privileges.

According to various embodiments, protected resource administrators/owners can grant higher-privilege rights to service users as requested, with these privileges expiring after their designated period. In some embodiments, the system restrict service users to request access only to resources for which they have been granted request rights. This streamlines or otherwise avoids the user account provisioning required in related art systems.

In some embodiments, the system implements an audit log to track when and by whom privileged rights were requested, used, and released. The system can serve as a proxy service via which a user accesses protected resources. As part of this proxy service, the system intercepts and tracks access events, including SQL statements, performed with respect to the protected resources. The system can store information pertaining to these access events for audit purposes, such as in the event that a protected resource suffers a failure resulting from an update.

In some embodiments, the system provides web browser-based access to protected resources. The system enables service users to access the protected resources (e.g., production databases, Kubernetes clusters, firewall instances, MongoDB, and other protected resources) directly from a web browser on a client system. This eliminates the need to install multiple tools on their desktop. Implement auditing of user activities, including tracking executed SQL statements.

In some embodiments, the system simulates access activities before committing the access activities to the production/live data of the protected resource. This simulation or dry-runs of manipulation allows users to review the expected result of the access activity and determine whether to commit the access activity after reviewing the expected result. The system may additionally enable peer-reviewing of access events (e.g., data manipulation SQL statements. For example, access events are not committed to the production/live version of the protected resource until the appropriate users/roles have reviewed and confirmed that the access event is to be committed. Thus the system allows users to preview the effects before actual execution.

The system provides a more robust security with respect to protected resources than related art systems. The system can ensure that users are granted permissions only when needed and that the granted permissions extend for a limited time period, ensuring heightened security.

Additionally, users can access protected resources from any location without the need to install tools on their desktop, as generally required by related art systems. As long as a web browser is available, seamless access is possible.

FIG. 1 is a block diagram of an environment for managing access to a protected resource according to various embodiments. In some embodiments, system 100 is implemented by at least part of system 200 of FIG. 2. In some embodiments, at least part of system 100 implements one or more of processes 1000-1800.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or parked domains, or traffic for certain applications (e.g., SaaS applications), or malicious or invalid authentication requests. In some embodiments, data appliance 102 is also configured to enforce policies with respect to traffic that stays within (or from coming into) enterprise network 110.

In some embodiments, data appliance 102 is configured to classify network traffic (e.g., classify as benign, vulnerable, malicious, etc.). Data appliance 102 may classify the network traffic based on the intended domain or other characteristics of the network traffic. For example, data appliance may query a mapping of domains to maliciousness classifications such as a whitelist of benign domains, a blacklist of vulnerable or malicious domains, etc. As another example, data appliance 102 may classify the network traffic based on querying a classifier (e.g., a machine learning model) for the predicted classification. The classifier may be comprised locally at data appliance 102 or remotely such as comprised in security platform 140.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including (a) managing/maintaining a security policy configuration(s) for enterprise network 110 and/or devices connected to enterprise network 110 (e.g., managed devices, security entities, protected devices such as firewalls or databases, etc.), (b) enforcing the security policy configuration or causing a security entity (e.g., a firewall) to enforce the security policy configuration, (c) classifying network traffic, (d) classifying authentication requests and/or connection requests, (e) determining a manner by which authentication requests and/connection requests are to be handled (e.g., based at least in part on a predicted authentication classification, etc.), (f) training a machine learning (ML) model to generate predictions with respect to network traffic classifications, (g) perform networks/attack surface discovery process to identify endpoints and services provided on the network, (h) analyze the network/attack surface to identify vulnerabilities on the attack surface (e.g., vulnerabilities for endpoints or services delivered across the network), (i) manage access or permissions to protected resources (e.g., remote services, databases, firewall configurations, etc.), (j) receive a request to access a protected resource from a user, (k) prompt a protected resource owner or administrator to review and approve/reject an access request or request for change of a user's permissions, (l) receive an instruction for approving/rejecting an access request or request for change of a user's permissions, (m) serve as a proxy for access requests to a protected resource(s), (l) log access requests or activity performed with respect to a protected resource(s), (n) provide the log in connection with a user's (e.g., an administrator's) audit of other activity performed with respect to the protected resource(s), (o) receive from a user (e.g., a client system associated with the user) an access request to attempt to access the protected resource(s), (p) forward the access request to a service that provides the protected resource(s), (q) generate a token for the service providing the protected resource to validate the user's permissions, (r) send the token to the service, (s) receive the service or information pertaining to the requested access of the protected resource (s), (t) send/forward the service to the user.

Security platform 140 may implement other services, such as determining an attribution of network traffic to a particular DNS tunneling campaign or tool, indexing features or other DNS-activity information with respect to particular campaigns or tools (or as unknown), classifying network traffic (e.g., identifying application(s) to which particular samples of network traffic corresponding, determining whether traffic is malicious, detecting malicious traffic, detecting C2 traffic, etc.), providing a mapping of signatures to certain traffic (e.g., a type of C2 traffic,) or a mapping of signatures to applications/application identifiers (e.g., network traffic signatures to application identifiers), providing a mapping of IP addresses to certain traffic (e.g., traffic to/from a client device for which C2 traffic has been detected, or for which security platform 140 identifies as being benign), performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), determining and/or providing an indication or a likelihood that authentication request is malicious, determining and/or providing an indication or a likelihood that network traffic for a particular traffic protocol (e.g., HTTP session data) is malicious, determining a model score, providing/updating a whitelist of input strings, files, domains, source addresses, destination address, authentication requests, or other characteristics or attributes of network traffic deemed to be benign, providing/updating input strings, files, domains, source addresses, destination address, authentication requests, or other characteristics or attributes of network traffic deemed to be malicious, identifying malicious input strings, detecting malicious input strings, detecting malicious files, predicting whether input strings, files, or domains are malicious, and providing an indication that an input string, file, or domain is malicious (or benign).

In some embodiments, protected resource access service 170 serves as a service for mediating access to one or more protected resources. For example, protected resource access service 170 serves as a proxy via which a user accesses a protected resource. The mediating access to the one or more protected resources includes facilitating the obtaining/granting of the requisite permissions to access the protected resource. A client system (e.g., a user) can access the protected resource by connecting to protected resource access service 170, such as via a web browser running on the client system.

The client system sends to protected resource access service 170 a request for permission to access a protected resource. The client system configures the request via a user interface provided by protected resource access service 170. In some embodiments, the request comprises one or more parameters associated with the permissions being requested, such as an indication of the protected resource, a type of access (e.g., read, write, edit, delete, etc.), a length of time for which the permissions are requested (e.g., an expiry time), etc. Various other types of parameters may be comprised in the request.

In response to sending the request for permission to access the protected resource, protected resource access service 170 determines whether to provide the user/client system with the applicable permissions. For example, protected resource access service 170 can prompt (e.g., send an alert/request) to an owner or administrator associated with the protected resource. In response to receiving a response from the owner or administrator, such as an instruction to approve/deny the request, protected resource access service 170 correspondingly handles the request for the permissions. In response to receiving the instruction to approve the request for permission to access the protected resource, protected resource access service 170 grants the user with the permission to access the protected resource. Protected resource access service 170 may generate a token to be used during subsequent access requests with respect to the protected resource. Conversely, in response to receiving the instruction to deny the request for permission to access the protected resource, protected resource access service 170 can blackhole the request (e.g., disregard the request), provide an indication to the user that the request for permissions was denied, etc.

In some embodiments, protected resource access service 170 receives from a user/client system a request to access the protected resource(s). In response to obtaining the access request, protected resource access service 170 obtains a token associated with the user to be provided to the service providing the protected resource(s). If a valid token (e.g., an unexpired token) has not already been generated/stored, protected resource access service 170 can generate (or cause to be generated) the token. Protected resource access service 170 sends the access request and token to the service that provides the protected resource(s). The service providing the protected resource(s) can use the token to authenticate the user. Protected resource access service 170 can receive the service providing the requested access, and in response to receiving the service, send/forward the service to the user/client system.

In some embodiments, protected resource access service 170 stores access requests or activity performed with respect to the protected resource(s), such as in a log. Protected resource access service 170 may store the log and provide the log in connection with a protected resource administrator or owner performing an audit of activity taken with respect to the protected resource. The log may be configured to be searchable by one or more of (i) a user associated with the logged activity, (ii) a type of activity performed with respect to the protected resource (e.g., a write, a read, a delete, etc.), (iii) a protected resource(s) associated with the activity, (iv) a part of the protected resource impacted by the activity, etc. Various other characteristics associated with the user, protected resource, and/or activity may be logged.

In some embodiments, protected resource access service 170 can provide a simulation of an expected impact that a particular access activity will have on a particular protected resource. For example, protected resource access service 170 receives the access request from a user/client system in connection with a request to simulate a dry run of implementing the access activity. Protected resource access service 170 can query the protected resource and create a representation of a result of performing the requested access activity on the protected resource. Protected resource access service 170 provides the representation of the result to a user/client system and can receive an instruction from the user to commit or reject the access activity. In response to receiving the instruction, protected resource access service 170 correspondingly handles the requested access activity.

In the example shown, the protected resource may be database 160 (or a part of database 160), data appliance 102 (e.g., a firewall configuration), DNS server 124, 126, etc. Various other types of resources may be implemented as the protected resource, such as a file, a website, a service, a policy (e.g., a security policy), etc.

Although the example shows that security platform 140 comprises dedicated protected resource access service 170, in various other embodiments, protected resource access service 170 may be implemented by another server(s)/service.

Security platform 140 may be further configured to classify network traffic, such as to determine whether the traffic is malicious or benign, or to determine a likelihood that the traffic is malicious or benign. Security platform 140 can store one or more classifiers (e.g., rule-based models, machine learning models, etc.). For example, security platform 140 implements a classifier for predicting whether authentication requests or connection requests (e.g., received from a proxy or client device) are malicious/benign. Security platform 140 can further store/implement one or more security policies, such as a traffic-handling policy, according to which security platform 140 causes the network traffic (e.g., the authentication requests) to be handled.

In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, protected resource access service 170 serves as a proxy for accessing a protected resource(s) In the example shown, protected resource access service 170 comprises access permission management module 172, access token module 174, resource access proxy module 176, logging module 178, and/or simulation module 179. Protected resource access service 170 can receive a request/indication to grant a user a set of permissions to access a protected resource. In response to receiving the request/indication, protected resource access service 170 requests an administrator or owner of the protected resource to confirm the granting of access to the user. In response to receiving a confirmation from the administrator or owner that the user is to be granted access, protected resource access service 170 grants access. In some embodiments, the user can then access the protected resource via a web browser. Protected resource access service 170 may be used as a proxy for the user to access the protected resource. As a result, protected resource access service 170 can log the user activity with respect to the protected resource.

Protected resource access service 170 uses access permission management module 172 to manage permissions for one or more protected resources. The managing the permissions for the one or more protected resources may include obtaining a configuration/confirmation for the granting of permissions to a particular user for a particular protected resource(s). For example, access permission management module 172 is configured to receive requests (e.g., via a web browser running on a client system) for permission to access a protected resource. As another example, in response to receiving the request for permission to access the protected resource, access permission management module 172 prompts the protected resource administrator or owner to approve or deny the request. Access permission management module 172 manages the user's permissions to the protected resource based on the approval/denial received from the protected resource administrator or owner.

Protected resource access service 170 uses access token module 174 to manage tokens used in connection with a user requesting access to a protected resource. The managing tokens may include generating the token, such as in response to the access permission being granted to the user (e.g., in response to receiving an approval from a protected resource administrator or owner) or in response to receiving from the user the first access request subsequent to the access permissions being granted to the user. Access token module 174 may store the tokens locally at protected resource access service 170 or remotely in a storage accessible to resource access proxy module 176. In some embodiments, the token is a JSON web token (JWT). The token may be generated based at least in part on one or more of: (a) the user, (b) a set of user permissions for a particular set of one or more protected resources, (c) an expiry time of the set of user permissions, etc. The expiry time associated with a particular user permission may be a predefined length of period from (i) the approval of the granting of permissions, (ii) the configuring of the granting of permissions, (iii) the time at which the user requested the permissions, (iv) the time at which the user first attempts to access the protected resource after the user is granted permissions, etc. In some embodiments, the maximum expiry time is predefined, such as 3 hours. The maximum expiry time is the maxim amount of time a user can request permissions for a single request. The user may issue a new request upon expiry of granted permissions.

Protected resource access service 170 uses resource access proxy module 176 to serve as a proxy for the access of a protected resource(s) by a user. In some embodiments, resource access proxy module 176 receives access requests from a user(s) requesting to perform an access activity with respect to a particular protected resource(s). Examples of the access activities include creating a new resource or reading, editing, or deleting a protected resource, etc. In response to receiving the access requests, resource access proxy module 176 sends the access request to the protected resource (e.g., a service providing the protected resource, such as a cloud service hosting the protected resource). Resource access proxy module 176 may obtain the token for the user's access to the protected resource and sends the token with the access request to the protected resource. Similarly, resource access proxy module 176 receives the service or protected resource access and sends/forwards the service to the user.

Protected resource access service 170 uses logging module 178 to log access activity with respect to a set of one or more protected resources. In some embodiments, in connection with resource access proxy module 176 serving as a proxy for a user's access of a protected resource (e.g., in response to intercepting access requests), logging module 178 stores information pertaining to the access request or access activity.

Protected resource access service 170 uses simulation module 179 to simulate a particular access activity with respect to a protected resource(s). The simulating the particular access activity comprises performing a dry-run of the updates/changes before committing the updates/changes (e.g., before implementing the updates to a production resource). Simulation module 179 determines the protected resource (or part of the protected resource) expected to be impacted by the access activity, stores the protected resource (or part of the protected resource) into a data structure (e.g., a temporary data structure), implements the changes to the copied data in the data structure, and represents the changes (e.g., configures a report or user interface to enable the user to assess the expected impact of the desired access activity). Simulation module 179 can further prompt the user (or another user associated with the protected resource, such as the resource administrator or owner) to confirm whether to commit the change. In response to receiving an instruction to commit the change, simulation module 179 provides the instruction to protected resource access service 170 which implements the change.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious samples, detecting parked domains, or otherwise determining that certain detected network traffic is to be further analyzed (e.g., using a finer detection model).

Figure 2:
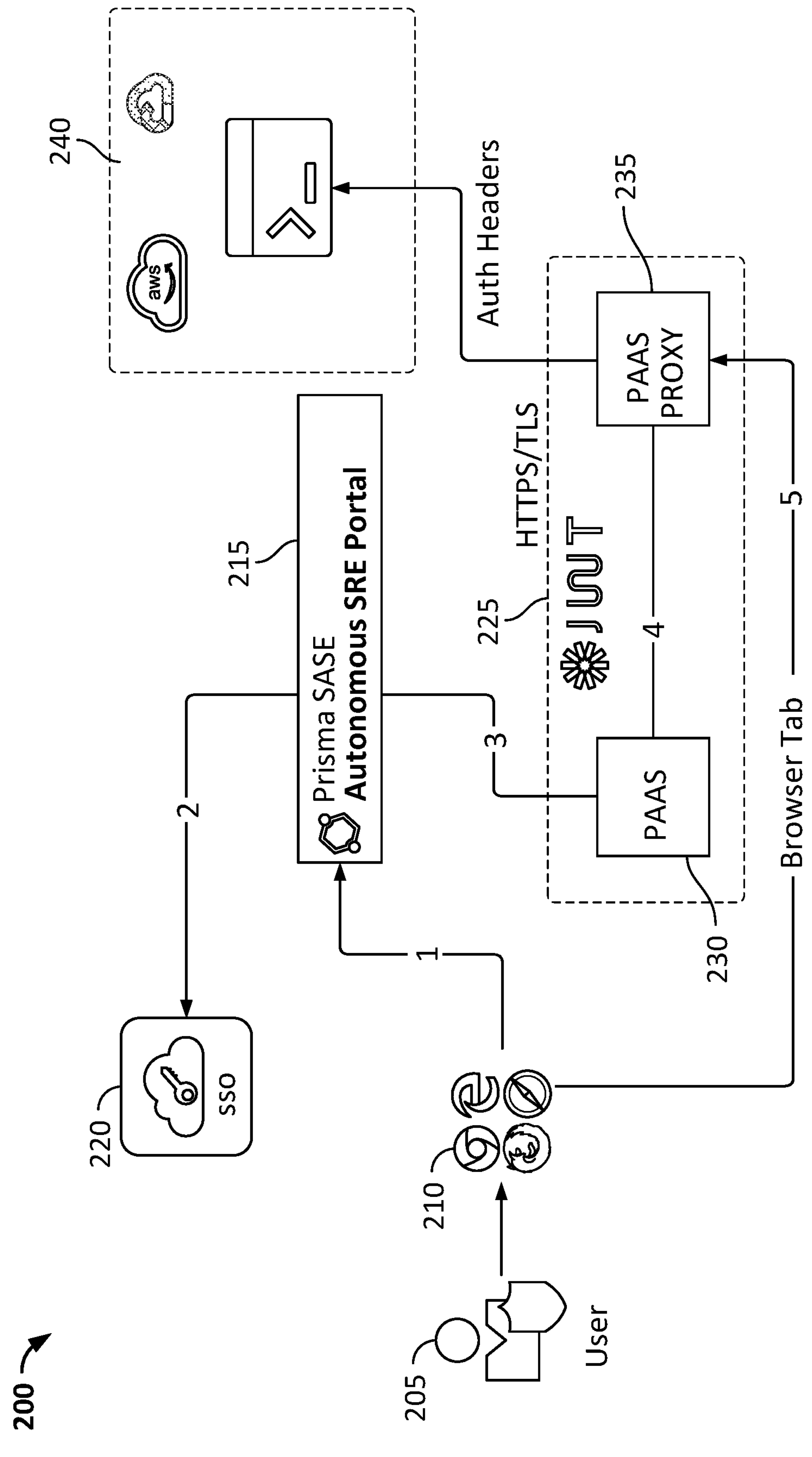
FIG. 2 is a block diagram of a system for managing access to a protected resource according to various embodiments.

FIG. 2 is a block diagram of a system for managing access to a protected resource according to various embodiments. In some embodiments, system 200 is implemented by at least part of system 100 of FIG. 1. In some embodiments, at least part of system 200 implements one or more of processes 1000-1800.

In some embodiments, system 200 is implemented by a security service, such as a by one or more servers that intercept access requests intended for a protected resource, manage access permissions to the protected resource, and serve as a proxy for a user to access protected resources.

In some embodiments, system 200 provides the proxy service or access permission service via a web service. For example, a client system (e.g., a user) accesses system 200 via a web browser running at the client system in order to request access permissions for a protected resource, to access a protected resource, or to perform a simulation/dry-run of an access activity before implementing the access activity (e.g., implementing a new protected resource or a change to an existing protected resource).

In some embodiments, system 200 provides a just-in-time (JIT) granting/controlling of permissions to protected resources. For example, system 200 configures the permissions to the protected resources contemporaneous with receiving requests for certain permissions from users.

System 200 is configured to serve as a service for mediating access to one or more protected resources. For example, system 200 serves as a proxy via which a user accesses a protected resource. The mediating access to the one or more protected resources includes facilitating the obtaining/granting of the requisite permissions to access the protected resource. A client system (e.g., a user) can access the protected resource by connecting to protected resource system 200, such as via a web browser running on the client system.

In the example shown, user 205 accesses the service 225 (e.g., a proxy service or an access permissions service) via web browser 210 (e.g., a browser application running on a client system). User 205 navigates the web browser 210 to secure access service edge (SASE) 215, which is configured to provide secure access to the service. In response to receiving user credentials and a connection request, SASE 215 authenticates the user by sending the credentials to authentication service 220 (e.g., a single sign-on (SSO) service). In response to user 205 being authenticated by authentication service 220, SASE 215 redirects the user (e.g., via web browser 210) to service 225. Web browser 210 can be configured to connect to SASE 215 and/or service 225 via HTTPS, etc.

In some embodiments, service 225 comprises a privileged access admin service (PAAS) 230 and a PAAS proxy 235. PAAS 230 is configured to manage the user permissions for accessing a set of one or more protected resources 240 (e.g., a resource hosted by a cloud service such as Amazon Web Services, Google Cloud, Microsoft Azure, etc.).

User 205 accesses service 225 to request certain privileges (e.g., permissions) to a particular protected resource. For example, in response to SASE 215 redirecting the user to service 225, service 225 provides a user interface to web browser 210 via which user 205 can define the parameters for the access permissions being requested. User 205 can specify the particular protected resource(s) for which access is requested, a type of permission (e.g., read, write, delete, copy, create, etc.), a length of time for the permissions (e.g., an expiration time for the requested permissions), a reason for requesting access to the protected resource (e.g., an business reason for seeking access).

In response to receiving the request for permissions, PAAS 230 configures and sends a prompt to an administrator or owner associated with the particular protected resource for the administrator/owner to approve or deny the request for the protected resource. The prompt may be sent via an electronic communication, such as email, a message in a collaboration tool (e.g., a direct or channel message in MS Teams, Slack, etc.), a ticket in a ticketing service (e.g., Jira), etc. As an example, the prompt may include a hyperlink to a user interface via which the administrator/owner can input the response (e.g., approval/denial) to the request for permissions. As another example, the administrator/owner can reply to the prompt directly in the service in which the prompt is presented (e.g., in the case that the prompt is provided in a channel for a collaboration tool such as MS teams, the user can directly approve the permissions request in the channel by, for example, inputting "approved", "yes" or other appropriate predefined response).

In some embodiments, certain users have a type of permission that allows for automatic approval of certain requested permissions. In response to receiving a request for permissions, PAAS 230 can determine whether the user has the associated privileges for an automatic approval, and if so PAAS 230 automatically grants the permissions (e.g., contemporaneous or in real-time with receiving the request for permissions). Otherwise, PAAS 230 can prompt the protected resource administrator/owner to approve/deny the request for permissions.

In response to receiving from the administrator/owner of the protected resource an instruction of whether to approve/deny the permissions request, PAAS 230 correspondingly configures the user permissions with respect to the particular protected resource. For example, in response to the permissions request being approved, PAAS 230 configures the permission to the particular resource. The permissions may be configured based on the permission request, such as based on the parameters of the permissions request (e.g., expiry time, identification of the protected resource, the user identifier, etc.).

In some embodiments, user 205 attempts to access the set of protected resources 240. User 205 directs web browser 210 (e.g., opens a tab in the web browser and navigates to access a particular protected resource) to PAAS proxy 235. PAAS proxy 235 serves as a proxy service via which user 205 accesses the set of protected resources 240. In response to receiving an access request from user 205, PAAS proxy 235 sends (e.g., via HTTPS/TLS, etc.) the request to the particular protected resource (or the service providing the protected resource such as a cloud service hosting the protected resource). In connection with the request forwarded to the particular protected resource, PAAS proxy 235 may send a token indicating that user 205 has permission to access the particular protected resource.

The protected resource validates the token and authenticates the user. The token may comprise information indicating the user identifier (e.g., user 205), the permission type(s), the particular protected resource associated with the permissions, and/or an expiry date for the permissions. In response to validating the token, the protected resource is accessed. For example, the cloud service provides the access to the protected resource and PAAS proxy 235 correspondingly provides the access to user 205 (e.g., via a user interface provided by web browser 210).

The token is generated after the permissions are granted to the user. In some implementations, the token is generated contemporaneous with the granting of the permissions to the user (e.g., contemporaneous with receipt of the approval from the administrator/owner). In some implementations, the token is generated in response to PAAS proxy 235 receiving a first access request subsequent to the permissions being granted.

In some embodiments, PAAS proxy 235 is configured to log the access requests to the set of protected resources 204. Additionally, or alternatively, PAAS proxy 235 logs the access activity of certain protected resources. For example, if the protected resource being accessed is a database, PAAS proxy 235 receives queries from user 205 and records all queries in the log. As another example, if the protected resource is a cluster of virtual machines (e.g., a Kubernetes cluster), the commands input by the user (or any inputs submitted to web browser 210) are tracked and logged. Service 225 can expose the log of access activity to protected resource administrators or owners or other such individuals/roles having the necessary permissions. The log can be exposed to be searchable or configured with filters.

A user may audit the log of access activity in response to a disruption in the protected resource. For example, if user 205 implements a change to a protected resource which causes an unintended effect, the protected resource administrator/owner may use the log to assess when and how the protected resource was modified to cause the unintended effect.

In some embodiments, service 225 enables a user to simulate (e.g., perform a dry-run) an access activity before implementing the access activity with respect to a certain protected resource. For example, because PAAS proxy 235 receives all commands, queries, requests, access activities, or other inputs from user 205, service 225 can use these commands, queries, requests, access activities, or other inputs to determine a particular protected resource in the set of protected resources 240 (or a particular part of the protected resource) that is invoked by the user (e.g., that is expected to be impacted by the command, query, request, etc.). Service 225 retrieves the data (e.g., the part of the protected resource) expected to be impacted by the access activity and stores the data in a temporary data structure. Service 225 manipulates the data according to the intended access activity and provides a representation of a result of simulating the access activity with respect to the protected resource. Service 225 can prompt user 205 to commit or reject the modification (e.g., the access activity) such as based on the simulated result. Additionally, or alternatively, service 225 can prompt another use (e.g., a protected resource administrator or owner) to review the simulated result and confirm whether to commit the access activity to the protected resource.

Figure 3:
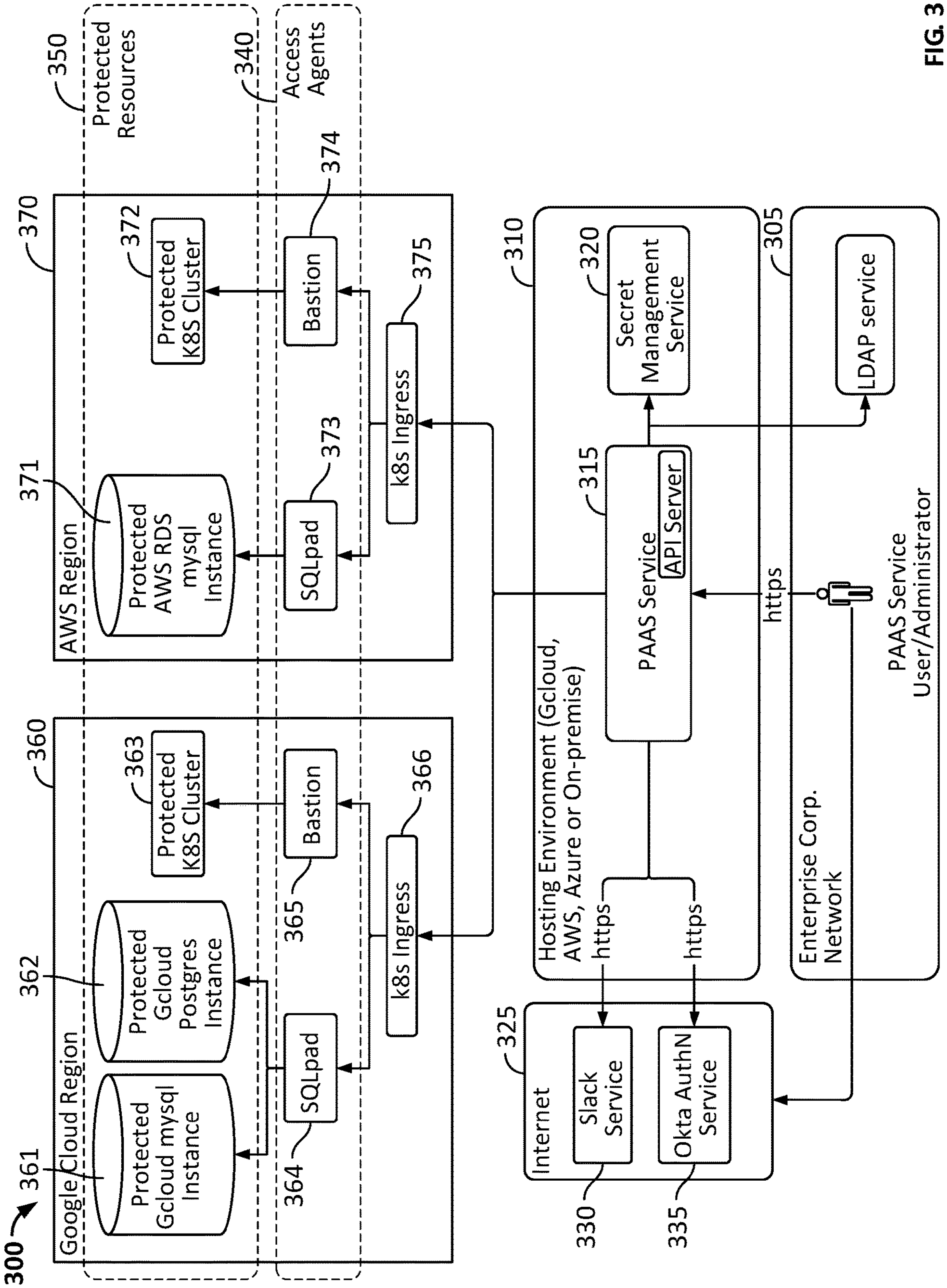
FIG. 3 is a block diagram of a system for managing access to a protected resource according to various embodiments.

FIG. 3 is a block diagram of a system for managing access to a protected resource according to various embodiments. In some embodiments, system 300 is implemented by at least part of system 100 of FIG. 1. In some embodiments, at least part of system 300 implements one or more of processes 1000-1800.

In the example shown, system 300 comprises service 310 for managing access permissions to a set of one or more protected resources (e.g., databases 361, 362, or 371, or cluster of virtual machines 361 or 372. Service 310 additionally serves as a proxy service via which users access the set of one or more protected resources. Service 310 comprises privileged access admin service (PAAS) 315 and secret management service 320.

A user, such as a client system connected to enterprise network 305 connects via a web browser to service 310 to request permissions for a protected resource. In connection with authenticating the user, if the user is not already signed on, the user is directed to an authentication service such as single sign-on service 335 provided on the Internet 325 as a web service. After signing on, the user can access PAAS 315 via a web browser. PAAS 315 configures a user interface via which the user can request permissions for a particular protected resource. The user interface comprises a plurality of fields via which the user defines parameters for the permissions request. In response to the user submitting the permissions request (e.g., via the user interface), PAAS 315 determines a particular user or channel to which to send/forward the request for approval. For example, PAAS 315 determines the appropriate protected resource administrator or owner and sends to administrator or owner the permissions request for approval.

In the example shown, PAAS comprises an API server service and a proxy server service. In some embodiments, the API server service handles API calls for permission management, resource access activities logging and retrieving, data update simulations and access token management. In some embodiments, the proxy server service proxies end user's resource access networking requests to appropriate access agents which further route the networking requests to the protected resources.

The sending/forwarding of the request for approval of the permissions request includes prompting the administrator/owner to provide an indication of whether the permissions are to be granted or denied. The prompt may be sent via an electronic communication, such as email, a message in a collaboration tool (e.g., a direct or channel message in MS Teams, Slack, etc.), a ticket in a ticketing service (e.g., Jira), etc. As an example, the prompt may include a hyperlink to a user interface via which the administrator/owner can input the response (e.g., approval/denial) to the request for permissions. In the example shown, in response to receiving the permissions request, PAAS 315 sends the request to collaboration service 330 (e.g., a direct or channel message in MS Teams, Slack, etc.). The administrator or owner can directly input to the collaboration service 330 thread/channel an instruction of whether to approve or deny the request. Alternatively, the administrator or owner can navigate to a webservice (e.g., a website) via which the administrator/owner can view all pending requests and provide instructions with respect to the pending requests.

As shown, the set of protected resources are hosted via cloud services 360 (e.g., Google Cloud) and 370 (e.g., Amazon Web Services). The user accesses the protected resource through service 310, which serves as a proxy for the access activity. Upon receiving the access request, service 310 determines the service that provides the protected resource(s) associated with the access request and sends an access request to the appropriate cloud service.

As an illustrative example, if the user is attempting to access database 361, PAAS 315 determines that the protected resource is hosted by cloud service 360 and correspondingly sends the request to cloud service 360. PAAS 315 may additionally send a token (e.g., a token retrieved from secret management service 320) associated with the user and/or protected resource for the cloud service 360 to authenticate the user.

Secret management service 320 may obtain (e.g., generate) a token based at least in part on the approval for granting the user certain permissions to a protected resource. For example, secret management service 320 generates (or causes another service to generate) the token as in response to the access permission being granted to the user (e.g., in response to receiving an approval from a protected resource administrator or owner) or in response to receiving from the user the first access request subsequent to the access permissions being granted to the user. Secret management service 320 may store the tokens locally/or remotely in a storage accessible to secret management service 320. In some embodiments, the token is a JSON web token (JWT). The token may be generated based at least in part on one or more of: (a) the user, (b) a set of user permissions for a particular set of one or more protected resources, (c) an expiry time of the set of user permissions, etc. The expiry time associated with a particular user permission may be a predefined length of period from (i) the approval of the granting of permissions, (ii) the configuring of the granting of permissions, (iii) the time at which the user requested the permissions, (iv) the time at which the user first attempts to access the protected resource after the user is granted permissions, etc. In some embodiments, the maximum expiry time is predefined, such as 3 hours. The maximum expiry time is the maxim amount of time a user can request permissions for a single request. The user may issue a new request upon expiry of granted permissions.

Returning to the illustrative example above, cloud service 360 receives the access request via routing proxy service 366. Routing proxy service 366 forwards the access request to the access agent layer 340, for example, by determining the applicable access agent associated with the protected resource being accessed and providing that access agent with the access request. If the user is attempting to access database 361, routing proxy service 366 sends the access request to access agent 365 (e.g., a service for running queries against the database, such as SQLpad). Access agent 364 parses the access request and determines the particular protected resource in protected resource layer 350 to be accessed. For example, access agent 364 determines that access to database 361 is being requested. Access agent 365 generates the appropriate queries to run against database 361 and then queries database 361. In response to receiving the query response(s), cloud service 360 (e.g., access agent 364) returns the response (e.g., the service for accessing the protected resource) to service 310. In turn, service 310 provides the response to the user.

In the example shown, cloud service 360 comprises a routing proxy service 366, access agents 364, 365 in access agent layer 340, and protected resources 361, 362, 363 in protected resource layer 350. Similarly, cloud service 370 comprises routing proxy service 375, access agents 373, 374 in access agent layer 340, and protected resources 371, 372 in protected resource layer 350.

In some embodiments, service 310 enables the user to simulate or perform a dry-run to determine a result of an intended access activity before committing the result to production. Service 310 can run the simulation by default whenever a protected resource is being accessed or based on a user's requesting to simulate the result before committing. An example of process for simulating the result includes:

1. Service 310 receives an update statement text provided by a user as an input (e.g., to the webservice via a user interface). An example update statement test may include an instruction to update a column in a protected resource.
2. Service 310 parses the update statement text (e.g., a SQL statement) to generate the following entities: (i) the target table name, (ii) the where clause of the update statement, (iii) the column names on the update set clause, and (iv) the column names on the update where clause.
3. Service 310 queries the protected resource schema (e.g., the target database schema) to obtain the primary key columns of the target table.
4. Service 310 determines a query for obtaining a dataset representing at least part of the protected resource before the update/change. The query may be a select statement which returns all updated rows with values of primary key columns, updated columns and columns in all where clause predicates.
5. Service 310 constructs an instruction (e.g., an SQL statement) for saving the values of all the primary key columns of the to-be-updated rows (e.g., the rows expected to be impacted by the access activity) to a temporary data structure. The temporary data structure may be a temporary table stored in the database.
6. Service 310 constructs an instruction (e.g., an SQL statement) for saving the expected result of the access activity, such as a dataset of values reflecting the update/change. The where clause of this instructions uses data saved in the temporary data structure which has values of the primary key columns for impacted rows.
7. Service 310 executes a batch query (e.g., an SQL batch) to obtain datasets for before the update/change and after the update/change (e.g., the expected resulting dataset). The batch query can comprise: (a) executing the query to obtain the dataset before the update/change is reflected, (b) saving the primary key values of the impacted rows (e.g., the to-be-updated rows) to a temporary data structure (e.g., a table), (c) starting the transaction, (d) executing the update statement, (e) executing a query to obtain the resulting dataset, and (f) rolling back the transaction.

In response to obtaining the resulting dataset (e.g., the expected result of the access activity), service 310 can run a comparison between the initial dataset (e.g., the data before the update) and the resulting dataset returned after execution of the user activity (e.g., the query). Service 310 can provide a representation of a result of the simulation to the user. In some embodiments, service 310 prompts the user to commit or reject the modification (e.g., the access activity) such as based on the simulated result. Additionally, or alternatively, service 310 can prompt another use (e.g., a protected resource administrator or owner) to review the simulated result and confirm whether to commit the access activity to the protected resource. In response to receiving an instruction to commit the modification, service 310 can send the query to the particular service hosting the protected resource for execution on the production/live protected resource.

Figure 4:
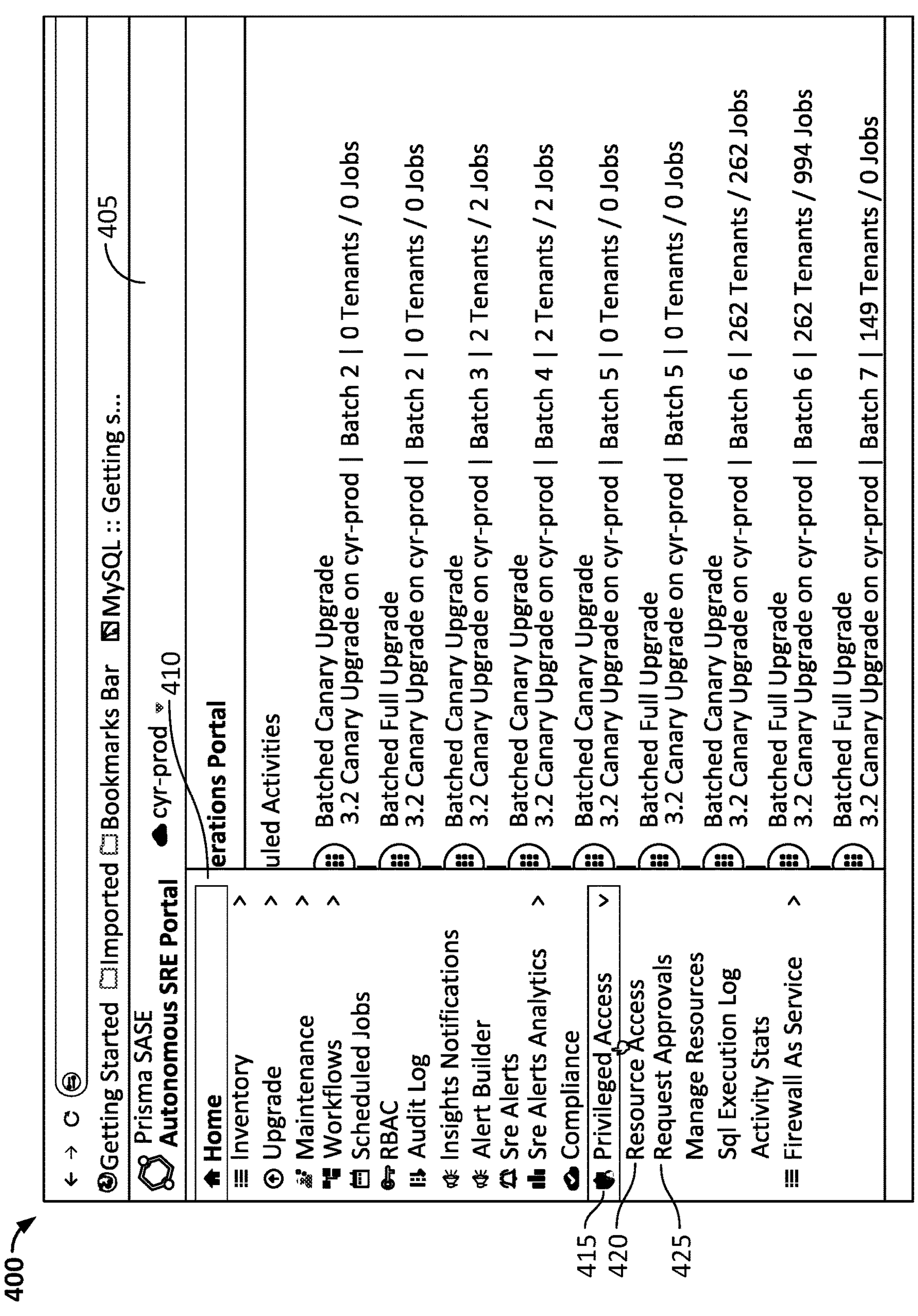
FIG. 4 is an example of a user interface configured for managing access to protected resources according to various embodiments.

FIG. 4 is an example of a user interface configured for managing access to protected resources according to various embodiments. In the example shown, user interface 400 is configured to be provided in a web browser, such as a by a browser running on a client system. User interface 400 can be configured to be a portal for managing or interfacing with protected resources. User interface 400 comprises detailed pane 405 and menu pane 410. Detailed pane 405 which provides detailed information for the function/information selected from menu pane 410. In the example shown, detailed pane 405 comprises a summary of scheduled activities, such as upgrades to protected resources. Menu pane 410 provides a list of selectable elements corresponding to different types of information for the protected resources or to perform different functionality with respect to the protected resources. In some embodiments, menu pane 410 comprises a privileged access sub-menu 415. When the user selects the privileged access sub-menu 415 a set of selectable elements pertaining to privileged access of protected resources is shown. In the example shown, privileged access sub-menu 415 comprises selectable elements for resource access 420, request approvals 425, manage resources, viewing a log of activity with respect to a protected resource, and summary/statistical information of activity performed with respect to the protected resource(s).

The user can select the selectable element for resource access 420 to invoke a functionality for requesting access (e.g., a set of permissions) to a protected resource. For example, selection of such selectable element causes the web browser to navigate to a web page (e.g., user interface 500, 550, and/or 575) for submitting a permissions request.

The user can select the selectable element for request approvals 425 to invoke a functionality for viewing pending permissions requests and approving/denying the permissions requests. For example, selection of such selectable element causes the web browser to navigate to a web page (e.g., user interface 800) for viewing permissions requests, such as the pending permissions requests.

Figure 5A:
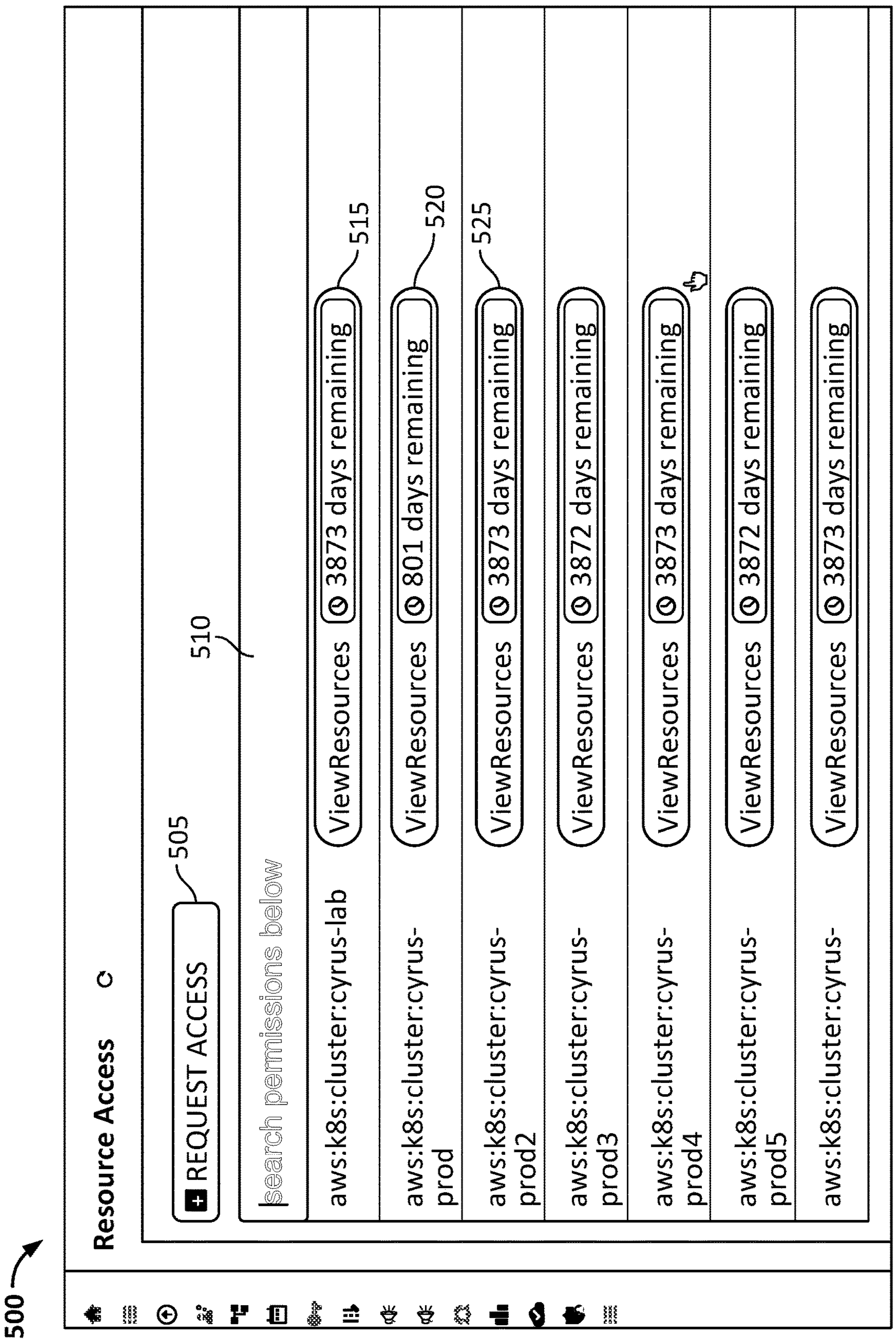
FIG. 5A is an example of a user interface configured for requesting access to protected resources according to various embodiments.

FIG. 5A is an example of a user interface configured for requesting access to protected resources according to various embodiments. In the example shown, user interface 500 allows a user to determine the currently granted permissions for protected resources or to request access for new permissions for a protected resource(s).

User interface 500 comprises selectable element 505 for requesting access to a protected resource. Upon selection of the selectable element 505, the system configures the user interface to provide a set of fields (e.g., a form) via which the user can input parameters for the requested permissions.

User interface 500 comprises search field 510 in which a user can search existing permissions. The set of existing permissions may be searchable based on a particular protected resource, a type of permissions, an expiry date, etc. On the resource access user interface 500, a list of existing permissions 515, 520, 525 is displayed. The list includes an indication of the particular protected resource, a permission (e.g., a view permission), and an expiry date (or expiry time).

Figure 5B:
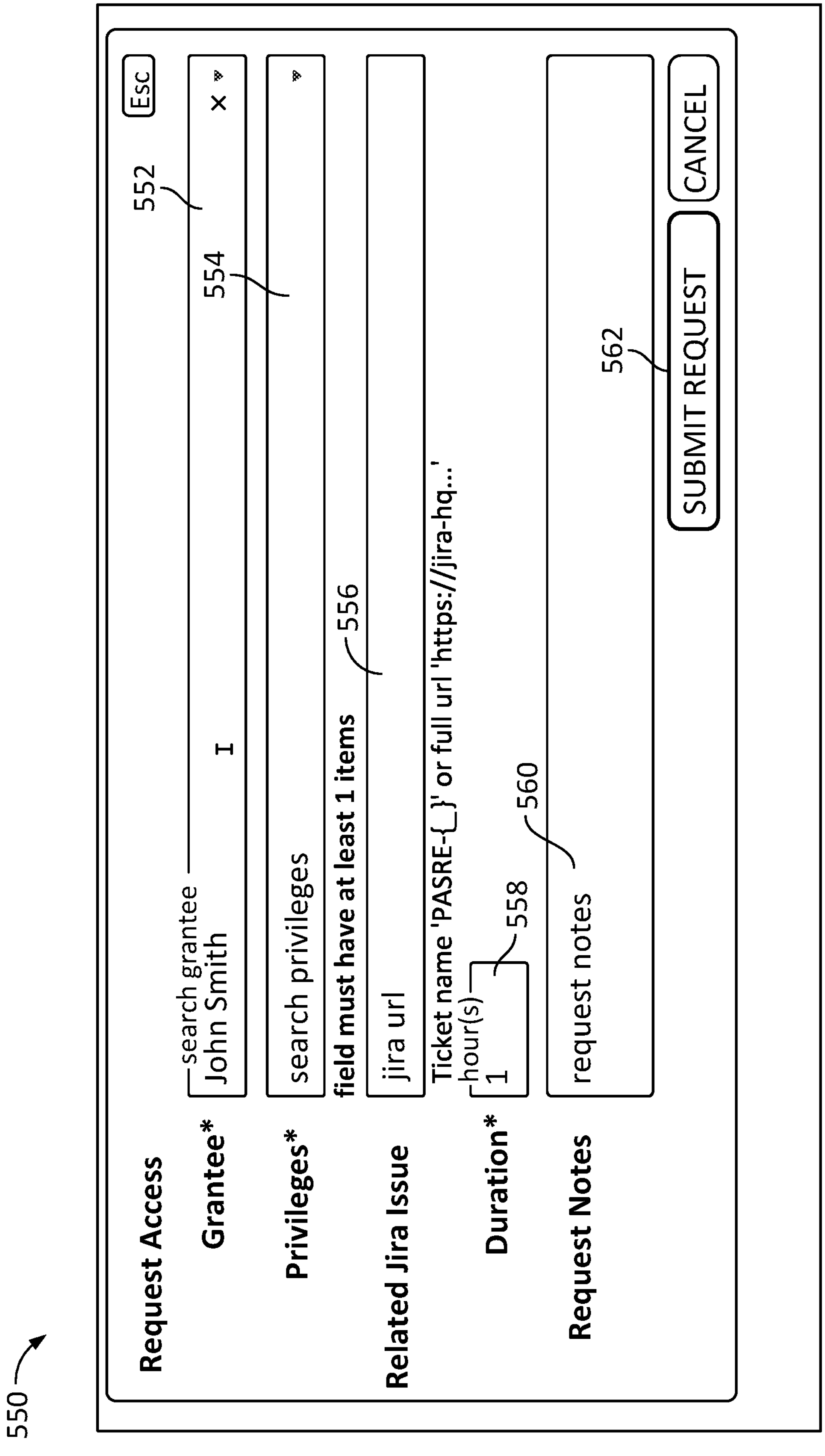
FIG. 5B is an example of a user interface configured for requesting access to protected resources according to various embodiments.
Figure 5C:
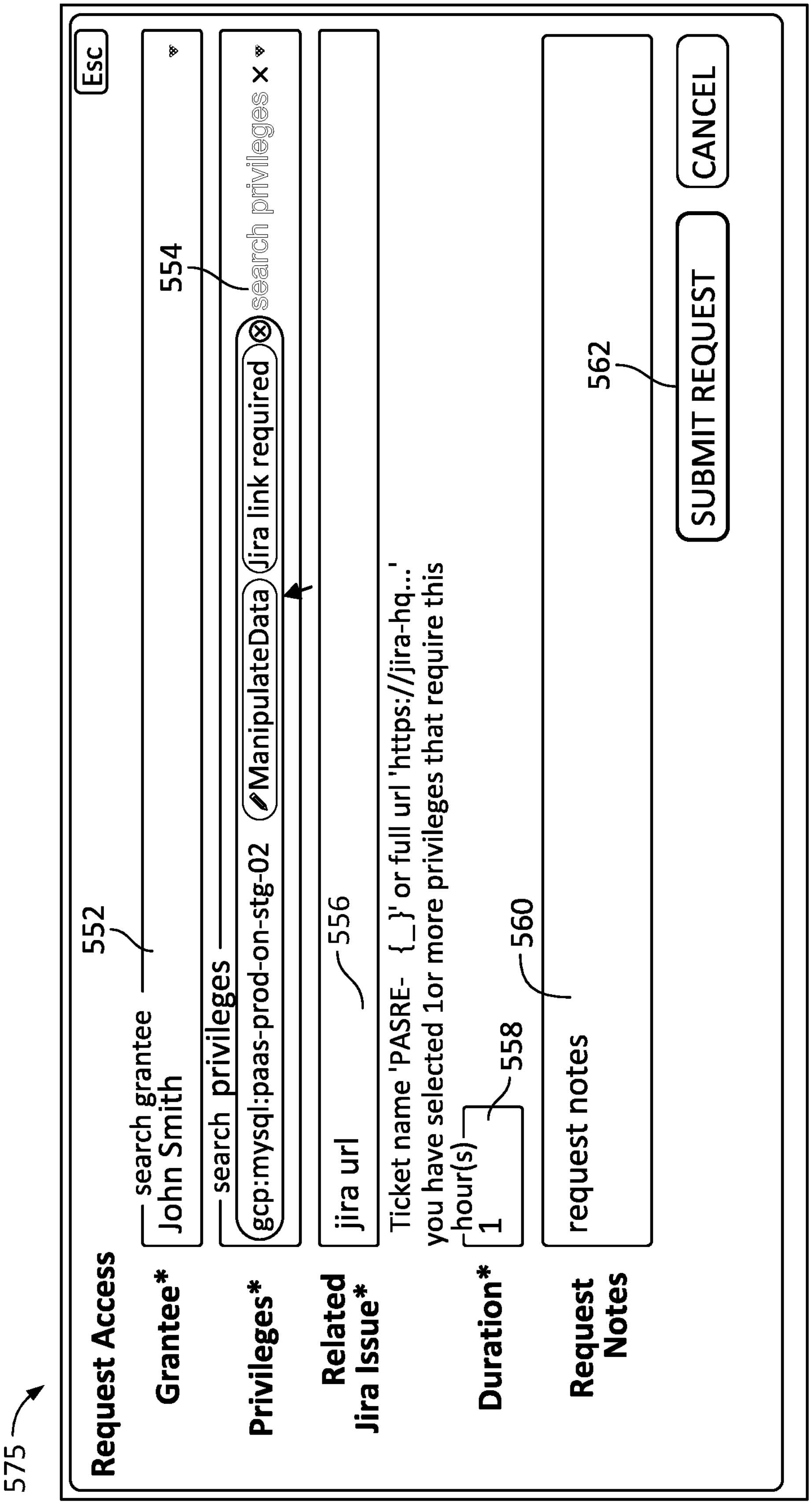
FIG. 5C is an example of a user interface configured for requesting access to protected resources according to various embodiments.

FIGS. 5B and 5C are examples of a user interface configured for requesting access to protected resources according to various embodiments. In the example shown, user interface 550 enables a user to request access to protected resources, such as by enabling the user to define the parameters for the permissions being requested. User interface 550 may be invoked in response to selection of selectable element 505 of user interface 500. User interface 575 represents a permission request comprising defined parameters for the request.

User interface 550 comprises a grantee field 552, a privileges field 554, a business reason field 556, an expiry time field 558, and a notes field 560. Grantee field 552 is a field in which the user can define the one or more individuals or roles for which the permissions are requested. Privileges field 554 is a field in which the user defines the set of privileges to request. Examples of privileges include view/read, edit, delete, create, etc. Privileges field 554 may be a drop down menu of predefined privileges. Business reason field 556 is a field in which the user defines the business reason for requesting the privileges. For example, the user can associate the permissions request with an open Jira issue for the enterprise. The expiry time field 558 is a field in which the user defines the expiry date or duration for the requested permissions. Notes field 560 is a field in which the user can add free-form inputs, such as to provide a detailed note for the reason for the request, or other information that may be important to the administrator/owner when determining whether to approve/deny the request.

In response to defining the parameters for the permissions request, the user can select the submit button 562 to submit the request for approval/denial.

Figure 6:
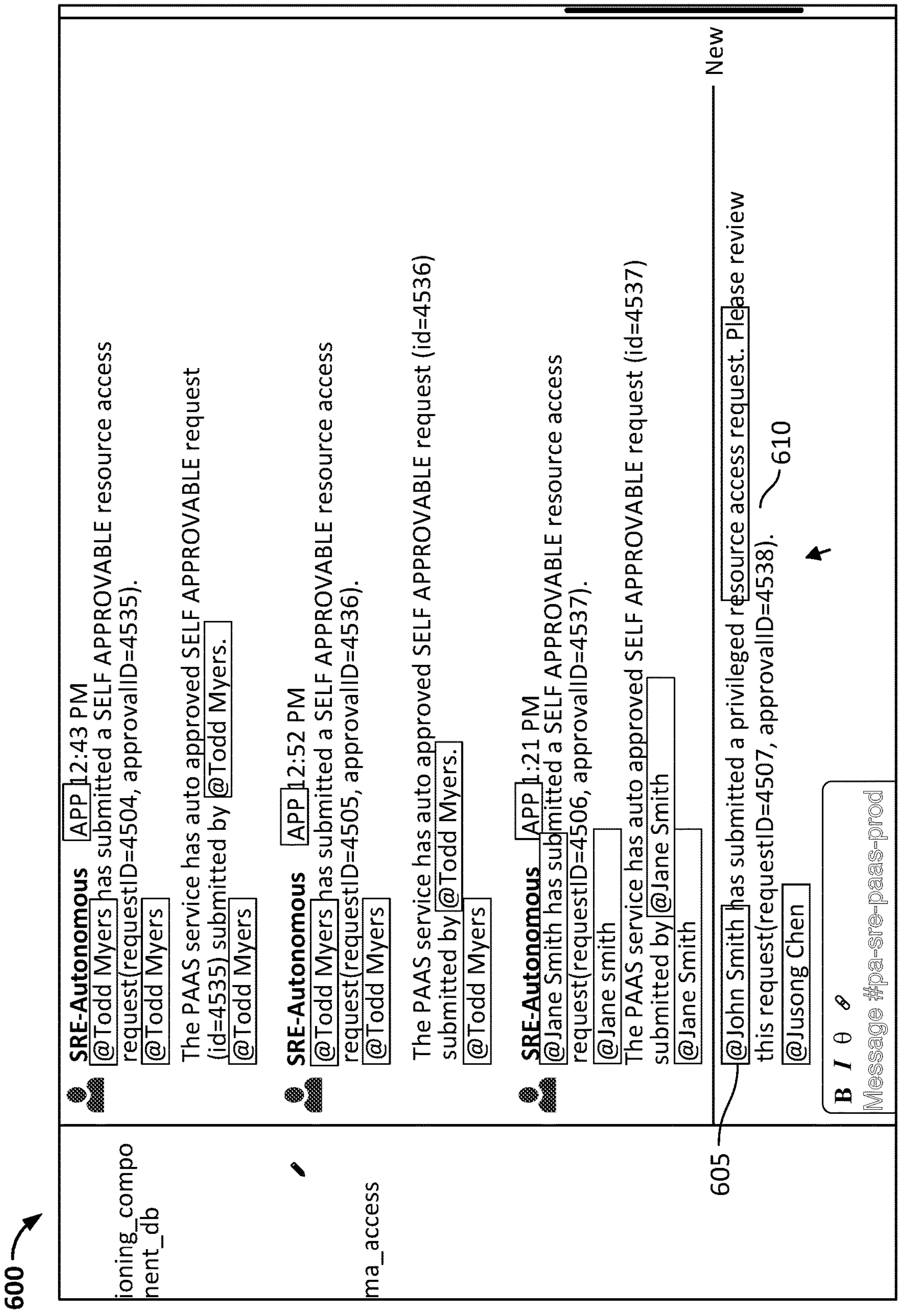
FIG. 6 is an example of a user interface configured for granting access to protected resources according to various embodiments.

FIG. 6 is an example of a user interface configured for granting access to protected resources according to various embodiments. In the example shown, user interface 600 of a collaboration tool is configured to communicate the permissions requests received by the system. In response to receiving the permissions request, the system sends information pertaining to the request to the collaboration tool. For example, the system generates a message in the collaboration tool identifying the requesting user 605 and a hyperlink 610 to the request. The message can be sent to a channel in which authorized users (e.g., protected resource administrators/owners) can approve/deny requests. Alternatively, the message can be sent to a specific individual. Hyperlink 610 can invoke a browser to navigate to a web page configured to provide pending permissions requests or detailed information for the particular pending permission request.

Figure 7:
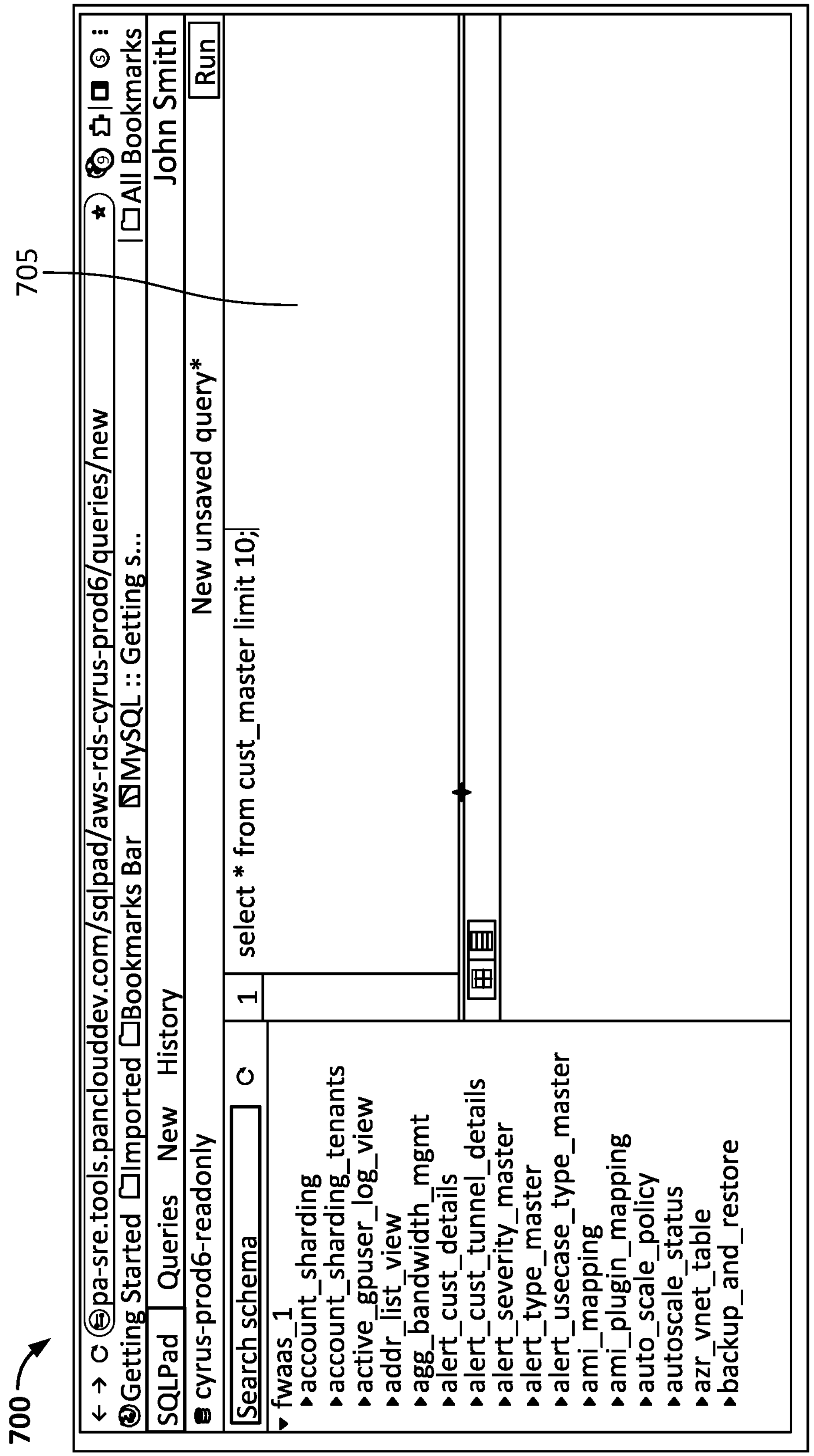
FIG. 7 is an example of a user interface configured for accessing a protected resource according to various embodiments.

FIG. 7 is an example of a user interface configured for accessing a protected resource according to various embodiments. In some embodiments, users access the protected resource via a web page. For example, the system (e.g., the PAAS service or proxy service) configures user interface 700 to expose access for the protected resource. User interface 700 comprises a query field 705 in which the user defines the query or access activity to be performed with respect to the protected resource.

Figure 8:
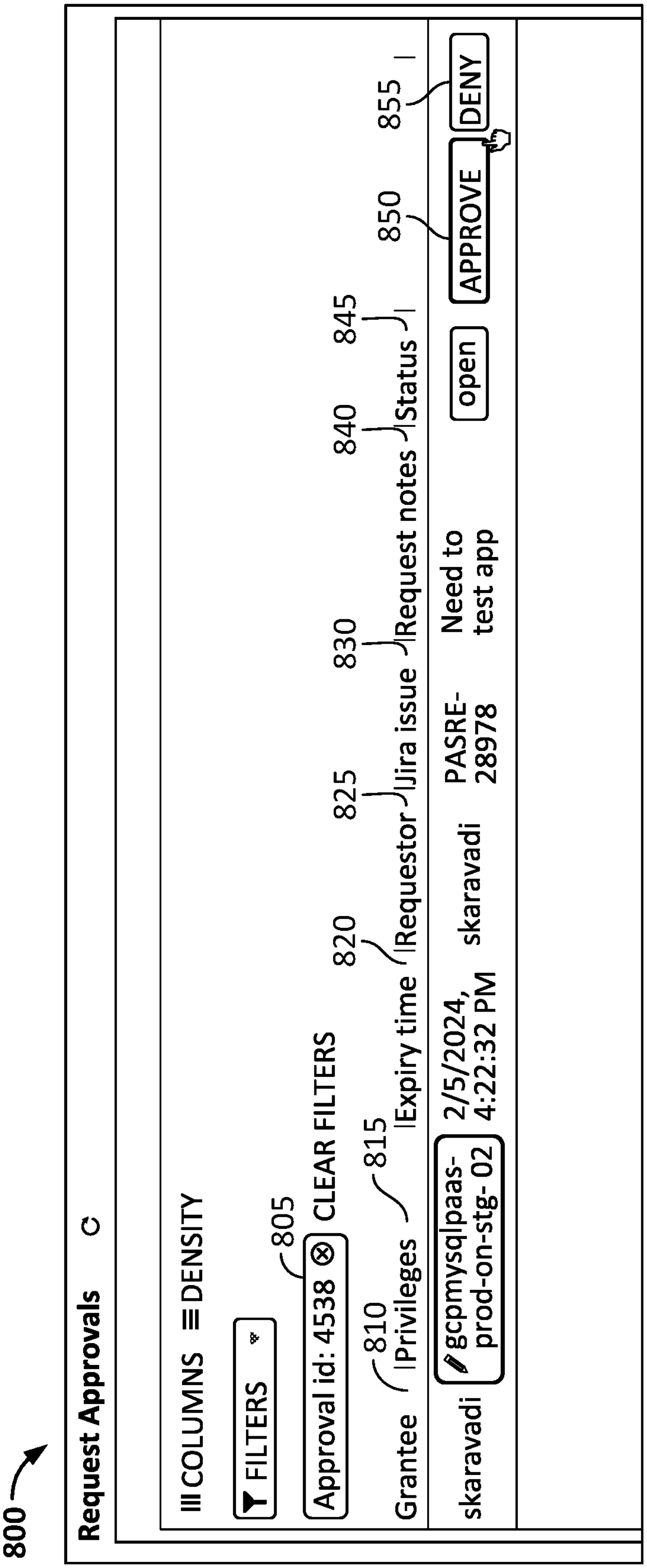
FIG. 8 is an example of a user interface configured for granting access to protected resources according to various embodiments.

FIG. 8 is an example of a user interface configured for granting access to protected resources according to various embodiments. In the example shown, the system provides user interface 800 for the administrator/owner of a protected resource(s) to view pending permissions requests. As an example, user interface 800 is provided in response to the user selecting hyperlink 610 comprised on user interface 600. User interface 800 may be configured to list all open/pending permissions requests or the particular request for which the administrator/owner is to take action (e.g., the particular request associated with hyperlink 610). For example, the pending permissions requests can be filtered according to one or more fields. The system can use information comprised in hyperlink 610 to automatically implement the filter.

The list of open/pending permissions requests comprises a grantee field 810, a requested privileges field 815, a privileges expiry time field 820, a requestor field 825, a business reason field 830, a notes field 840, a request status field 845, an approve button 850 and a deny button 855. The grantee field 810, a requested privileges field 815, a privileges expiry time field 820, a requestor field 825, a business reason field 830, a notes field 840 can be populated based on the parameters of the permissions request, such as the parameters defined in user interface 550.

FIG. 9A is an example of a user interface configured for managing logged access events according to various embodiments. In some embodiments, the system logs activity performed with respect to protected resources. Because the system serves as a proxy for a user to access the protected resource, the system has insight into the access activities. The system can represent the log in user interface 900.

In the example shown, user interface 900 comprises a plurality of fields, including a start time 905, a status field 910, a query text 915, an environment 920, a SQL statement type 925, a resource identifier 930, a row count 935, and a duration 940. Start time 905 indicates the time at which the access request was initiated, such as when the SQL query is received from the user. The status field 910 indicates a status of the access activity, such as finished/complete, in progress, pending, etc. The query text 915 comprises the specific query language used to change the protected resource. Environment 920 indicates the environment or tenant for which the protected resource is accessed. SQL statement type 925 indicates the access type, such as a read only, a write, a delete, a creation, etc. Resource identifier 930 indicates the protected resource associated with the access activity (e.g., the protected resource changed by the access activity). Row count 935 can indicate the number of rows impacted by the access activity. Duration 940 indicates the duration of the access activity, such as the runtime for the query.

Figure 9B:
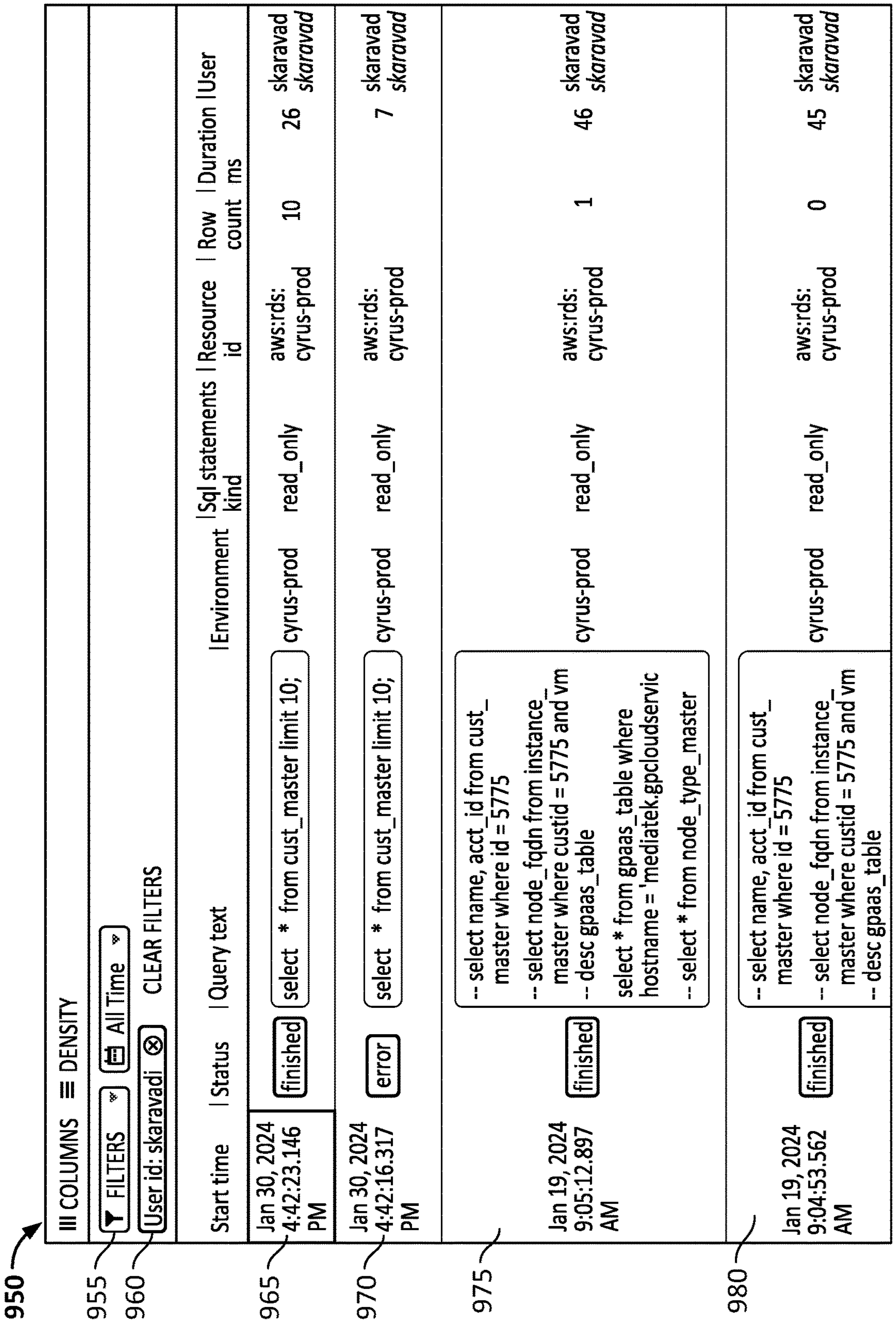
FIG. 9B is an example of a user interface configured for managing logged access events according to various embodiments.

FIG. 9B is an example of a user interface configured for managing logged access events according to various embodiments. The log of access activity can be searched in connection with auditing the access activities performed with respect to the protected resources. In the example shown, user interface 950 providing the log of access activity comprises filter element 955 that can be selected by a user to apply a predefined filter to search the log or to allow a user to define a specific filter. As illustrated, filter 960 is applied to filter the log to provide access activity performed by a particular user. In response to filter 960 being applied, the log is filtered to include entries 965, 970, 975, and 980 corresponding to the access activities performed by the user.

Figure 10:
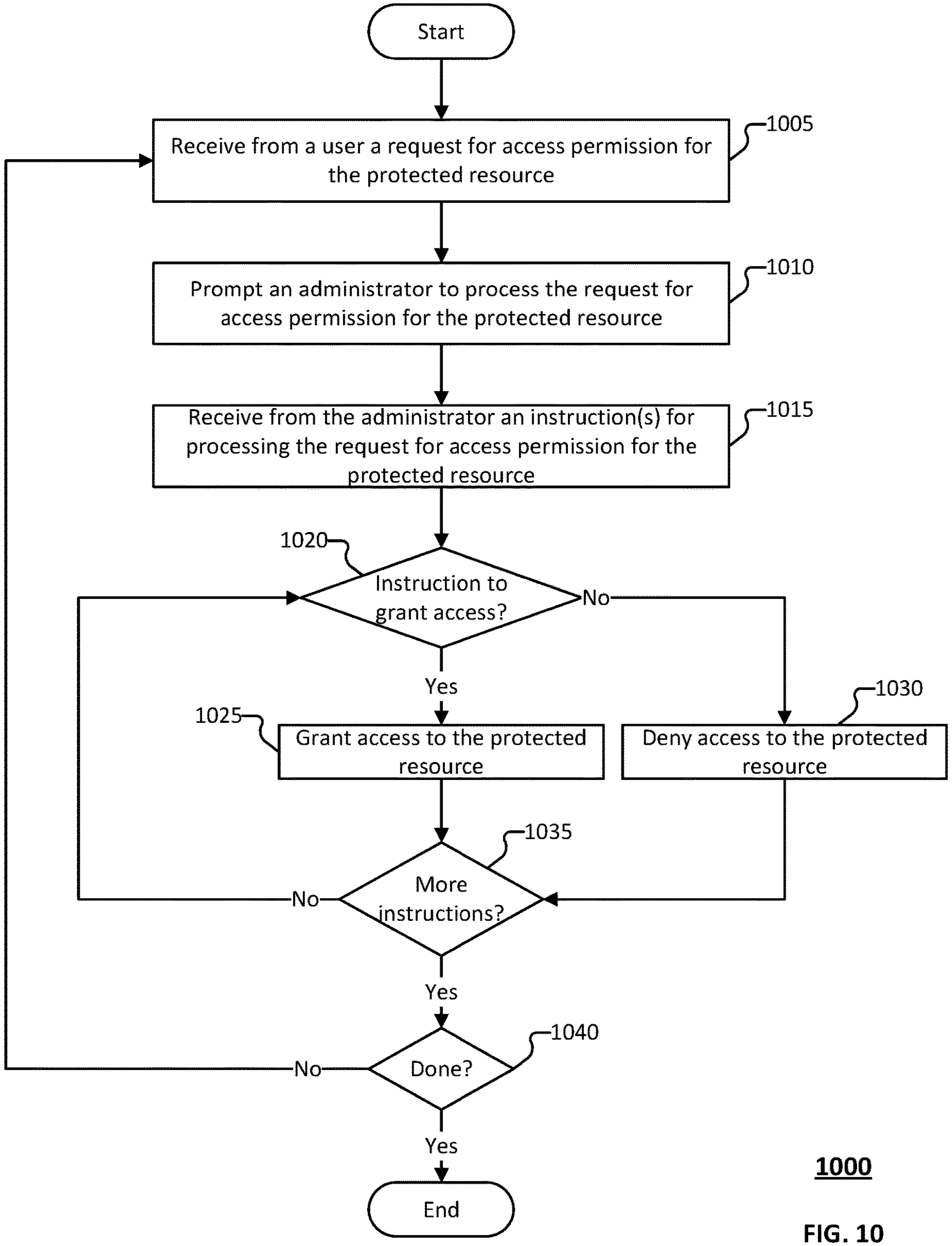
FIG. 10 is a flow diagram of a method for managing access to a protected resource according to various embodiments.

FIG. 10 is a flow diagram of a method for managing access to a protected resource according to various embodiments. In various embodiments, process 1000 is implemented at least in part by system 100 of FIG. 1, system 200 of FIG. 2, and/or system 300 of FIG. 3.

At 1005, the system receives from a user a request for access permission for protected resource. For example, the system receives a request for the requisite permissions to access the protected resource. The request for permissions can include a request for permission for a plurality of users or a group(s) of users. In some embodiments, the request corresponds to a request for granting access permission(s) to a protected resource(s) to a grantee. The grantee can be a user, such as the requesting user, or a user group.

At 1010, the system prompts an administrator to process the request for access permission for the protected resource. In response to receiving the access permissions request, the system can send an indication to the administrator/owner of the protected resource that an access permissions request is received and that the approve/deny input is required. The system can send the indication via a communication tool (e.g., MS Teams, Slack, Confluence, etc.) or by updating a web page with the pending permissions requests.

At 1015, the system receives from the administrator an instruction for processing the request for access permission for the protected resource.

At 1020, the system determines whether an instruction to grant access is received. In response to determining that the instruction to grant access is received, process 1000 proceeds to 1025 at which the system grants access to the protected resource. Conversely, in response to determining that the instruction to grant access is not received, process 1000 proceeds to 1030 at which the system denies access to the protected resource. In some embodiments, denying access to the protected resource comprises blackholing the request, deleting the request, or otherwise taking no action with respect to the request.

At 1035, the system determines whether another instruction(s) is to be processed. For example, in the case of the request for access permission requesting permission(s) for a plurality of users or a group(s) of users, the system can obtain a plurality of instructions respectively associated with each user or group of users, and correspondingly processes the instructions. In response to determining that another instruction(s) is to be processed, process 1000 returns to 1020 and process 1000 iterates over 1020-1035 until no further instructions are to be processed. Conversely, in response to determining that no further instructions are to be processed, process 1000 proceeds to 1040.

At 1040, a determination is made as to whether process 1000 is complete. In some embodiments, process 1000 is determined to be complete in response to a determination that no further access requests are to be processed, no further access requests are to be mediated by a proxy service, an administrator indicates that process 1000 is to be paused or stopped, etc. In response to a determination that process 1000 is complete, process 1000 ends. In response to a determination that process 1000 is not complete, process 1000 returns to 1005.

Figure 11:
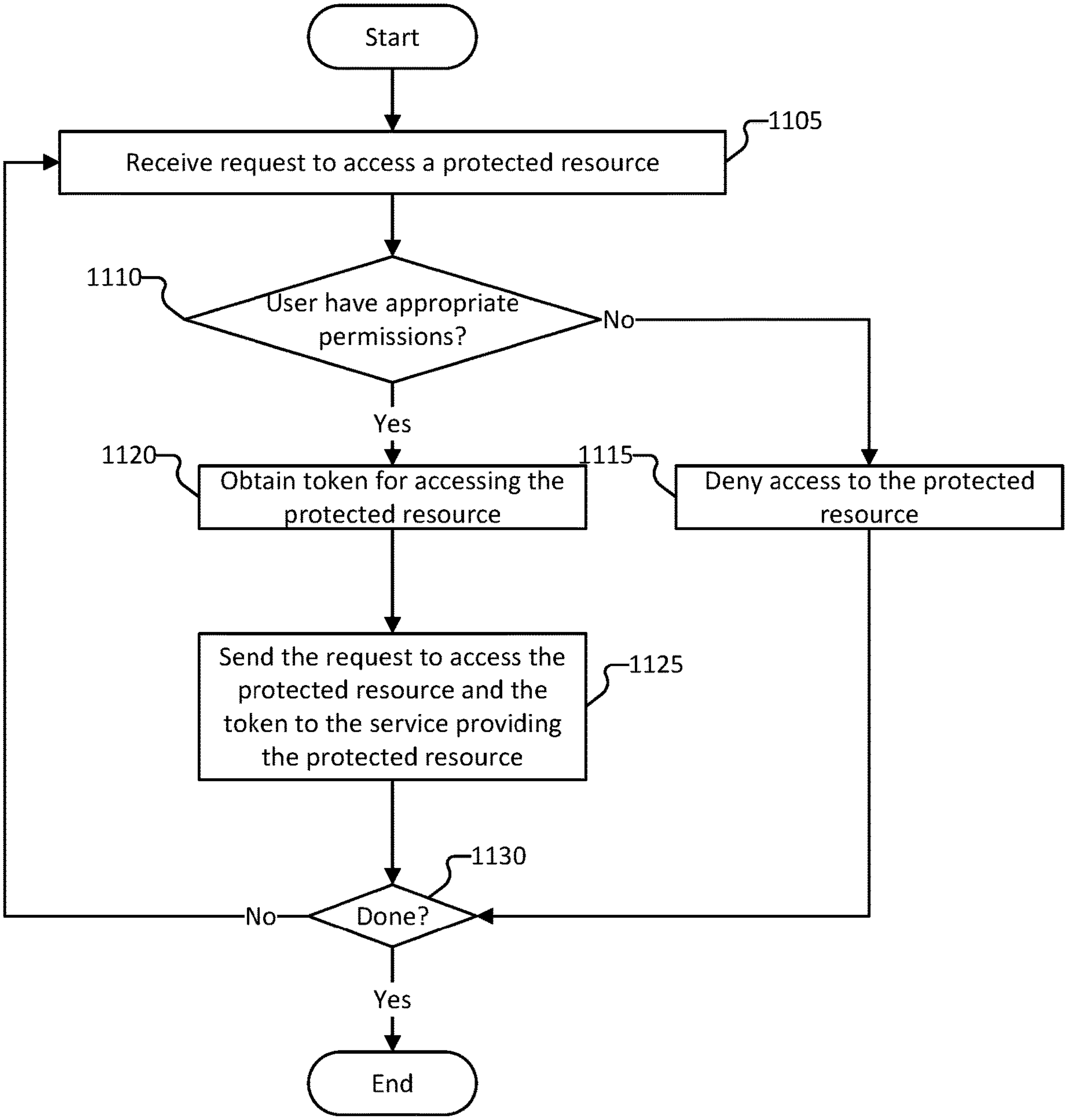
FIG. 11 is a flow diagram of a method for providing access to a protected resource according to various embodiments.

FIG. 11 is a flow diagram of a method for providing access to a protected resource according to various embodiments. In various embodiments, process 1100 is implemented at least in part by system 100 of FIG. 1, system 200 of FIG. 2, and/or system 300 of FIG. 3.

At 1105, the system receives a request to access a protected resource. At 1110, the system determines whether the user has appropriate permissions to access the protected resource. In response to determining that the user does not have appropriate permissions, process 1100 proceeds to 1115 at which the system denies the access to the protected resource. For example, the system blackholes the access request. Conversely, in response to determining that the user has appropriate permissions, process 1100 proceeds to 1120 at which the system obtains a token for accessing the protected resource. At 1125, the system sends the request to access the protected resource and the token to the service providing the protected resource. At 1130, a determination is made as to whether process 1100 is complete. In some embodiments, process 1100 is determined to be complete in response to a determination that no further access requests are to be processed, no further access requests are to be mediated by a proxy service, an administrator indicates that process 1100 is to be paused or stopped, etc. In response to a determination that process 1100 is complete, process 1100 ends. In response to a determination that process 1100 is not complete, process 1100 returns to 1105.

Figure 12:
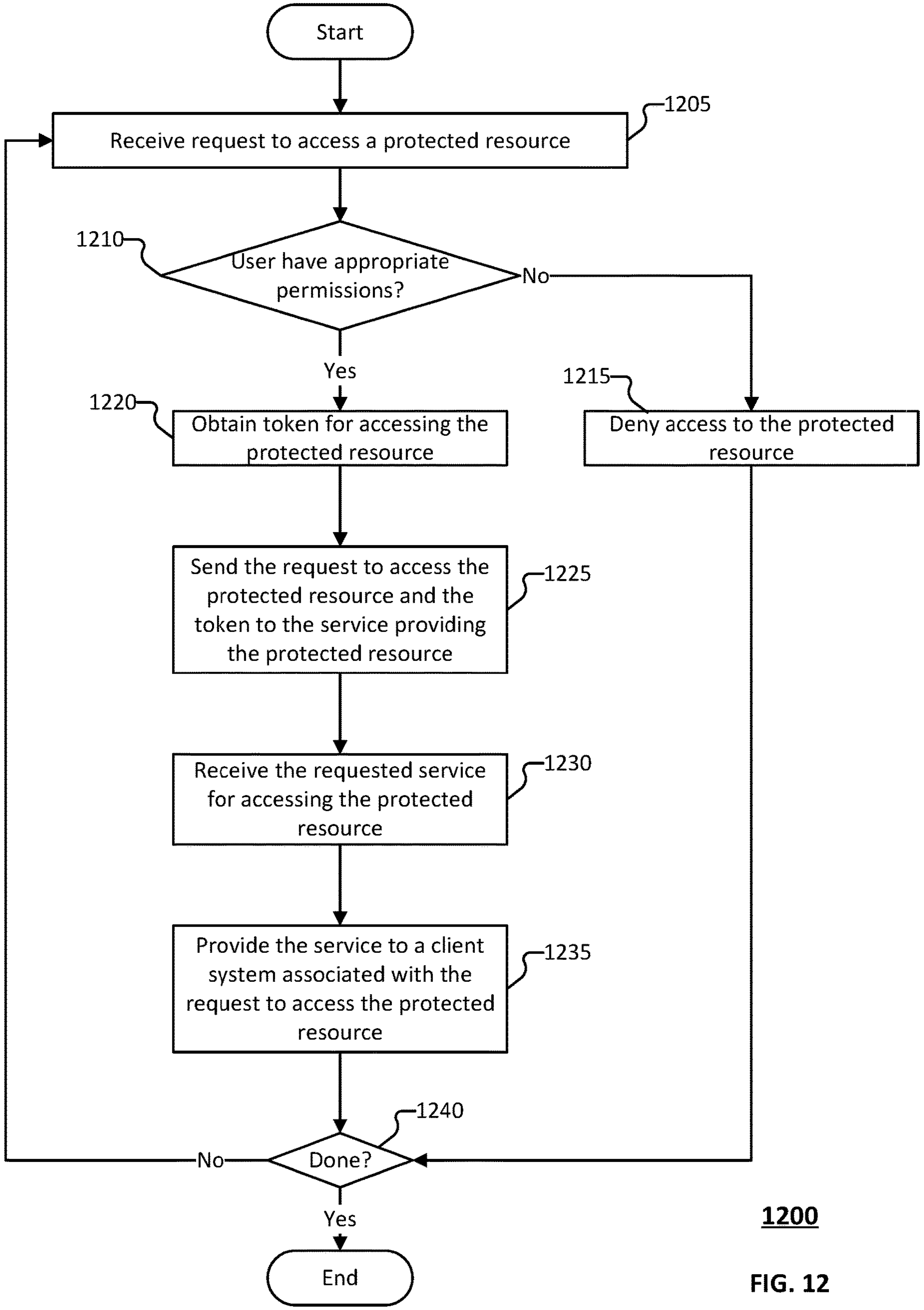
FIG. 12 is a flow diagram of a method for providing access to a protected resource according to various embodiments.

FIG. 12 is a flow diagram of a method for providing access to a protected resource according to various embodiments. In various embodiments, process 1200 is implemented at least in part by system 100 of FIG. 1, system 200 of FIG. 2, and/or system 300 of FIG. 3.

At 1205, the system receives a request to access a protected resource. At 1210, the system determines whether the user has appropriate permissions to access the protected resource. In response to determining that the user does not have appropriate permissions, process 1200 proceeds to 1215 at which the system denies the access to the protected resource. For example, the system blackholes the access request. Conversely, in response to determining that the user has appropriate permissions, process 1200 proceeds to 1220 at which the system obtains a token for accessing the protected resource. At 1225, the system sends the request to access the protected resource and the token to the service providing the protected resource. At 1230, the system receives the requested service for accessing the protected resource. At 1235, the system provides the service to a client system associated with the request to access the protected resource. At 1240, a determination is made as to whether process 1200 is complete. In some embodiments, process 1200 is determined to be complete in response to a determination that no further access requests are to be processed, no further access requests are to be mediated by a proxy service, an administrator indicates that process 1200 is to be paused or stopped, etc. In response to a determination that process 1200 is complete, process 1200 ends. In response to a determination that process 1200 is not complete, process 1200 returns to 1205.

Figure 13:
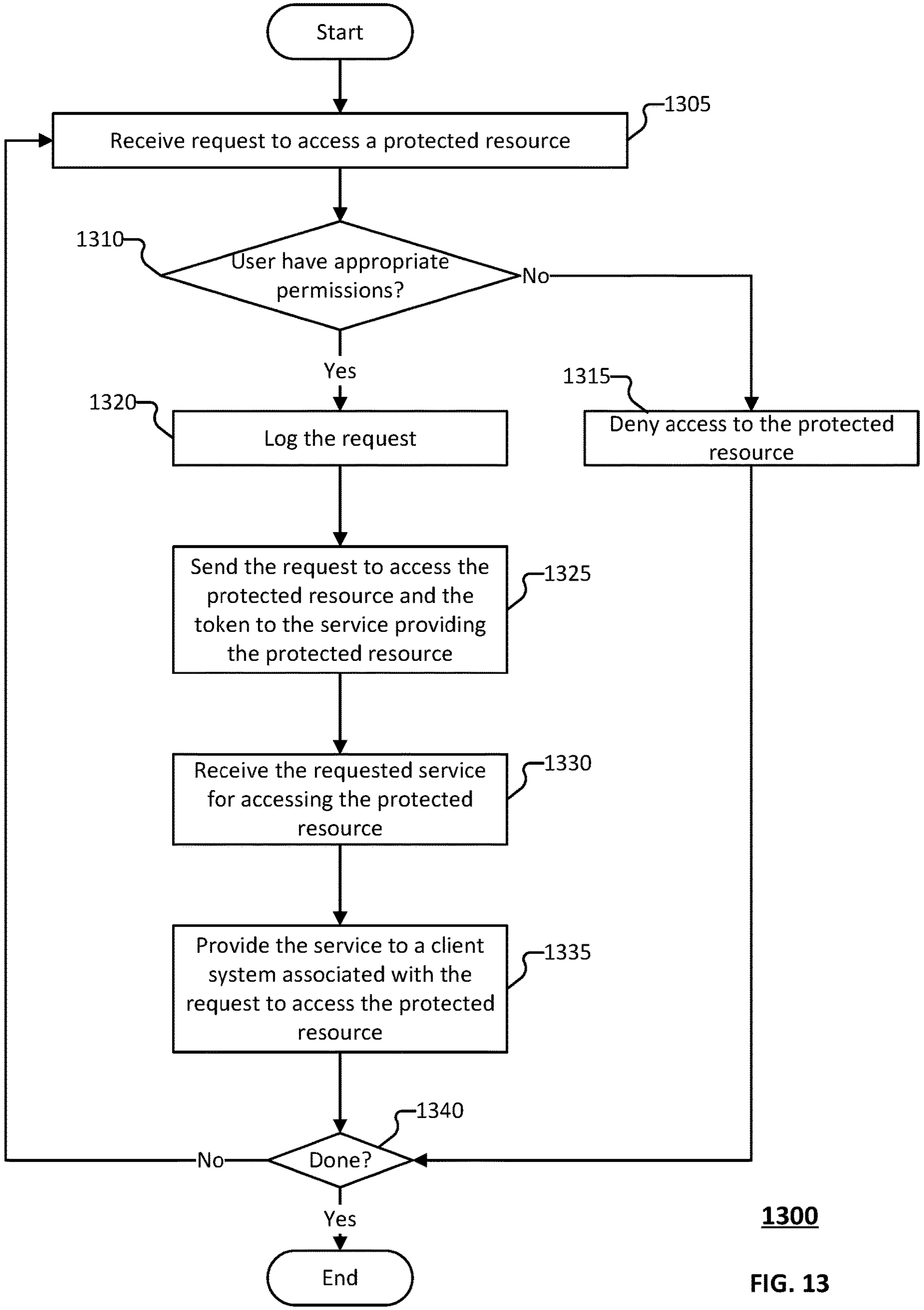
FIG. 13 is a flow diagram of a method for providing a proxy service for a protected resource according to various embodiments.

FIG. 13 is a flow diagram of a method for providing a proxy service for a protected resource according to various embodiments. In various embodiments, process 1300 is implemented at least in part by system 100 of FIG. 1, system 200 of FIG. 2, and/or system 300 of FIG. 3.

At 1305, the system receives a request to access a protected resource. At 1310, the system determines whether the user has appropriate permissions. In response to determining that the user does not have the appropriate permissions to access the protected resource, process 1300 proceeds to 1315 at which the system denies access to the protected resource. Conversely, in response to determining that the user has the appropriate permissions to access the protected resource, process 1300 proceeds to 1320 at which the system logs the request. At 1325, the system sends the request to access the protected resource and the token to the service providing the protected resource. At 1330, the system receives the requested service for accessing the protected resource. At 1335, the system provides the service to a client system associated with the request to access the protected resource. At 1340, a determination is made as to whether process 1300 is complete. In some embodiments, process 1300 is determined to be complete in response to a determination that no further access requests are to be processed, no further access requests are to be mediated by a proxy service, an administrator indicates that process 1300 is to be paused or stopped, etc. In response to a determination that process 1300 is complete, process 1300 ends. In response to a determination that process 1300 is not complete, process 1300 returns to 1305.

Figure 14:
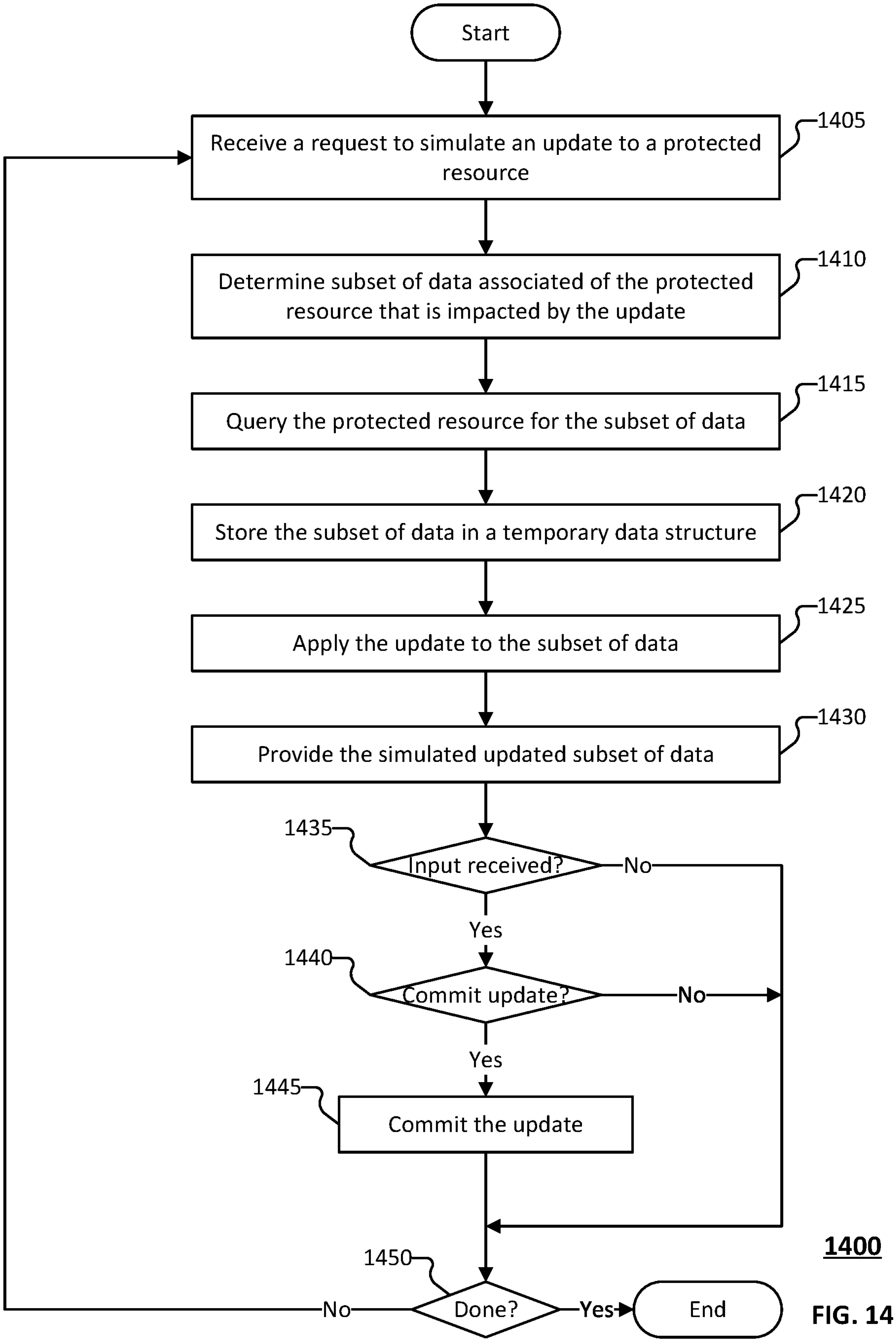
FIG. 14 is a flow diagram of a method for simulating an update to a protected resource according to various embodiments.

FIG. 14 is a flow diagram of a method for simulating an update to a protected resource according to various embodiments. In various embodiments, process 1400 is implemented at least in part by system 100 of FIG. 1, system 200 of FIG. 2, and/or system 300 of FIG. 3.

At 1405, the system receives a request to simulate an update to a protected resource.

At 1410, the system determines a subset of data for the protected resource. The subset of data is determined based on the system determining data that is expected be impacted by the update.

At 1415, the system queries the protected resource for the subset of data.

At 1420, the system stores the subset of data in a temporary data structure.

At 1425, the system applies the update to the subset of data.

At 1430, the system provides the simulated updated subset of data.

At 1435, the system determines whether an input is received. In response to determining that no input is received, process 1400 proceeds to 1450. Conversely, in response to determining that an input is received, process 1400 proceeds to 1440.

At 1440, the system determines whether to commit the update. The system can determine to whether to commit the update based at least in part on the received input. For example, the system determines whether the user selected to commit the update.

In response to determining not to commit the update, process 1400 proceeds to 1450. Conversely, in response to determining to commit the update, process 1400 proceeds to 1445 at which the system commits the update.

At 1450, a determination is made as to whether process 1400 is complete. In some embodiments, process 1400 is determined to be complete in response to a determination that no further access requests are to be processed, no further access requests are to mediated by a proxy service, no further updates are to be simulated, the update has been committed, the user has exited the system, an administrator indicates that process 1400 is to be paused or stopped, etc. In response to a determination that process 1400 is complete, process 1400 ends. In response to a determination that process 1400 is not complete, process 1400 returns to 1405.

Figure 15:
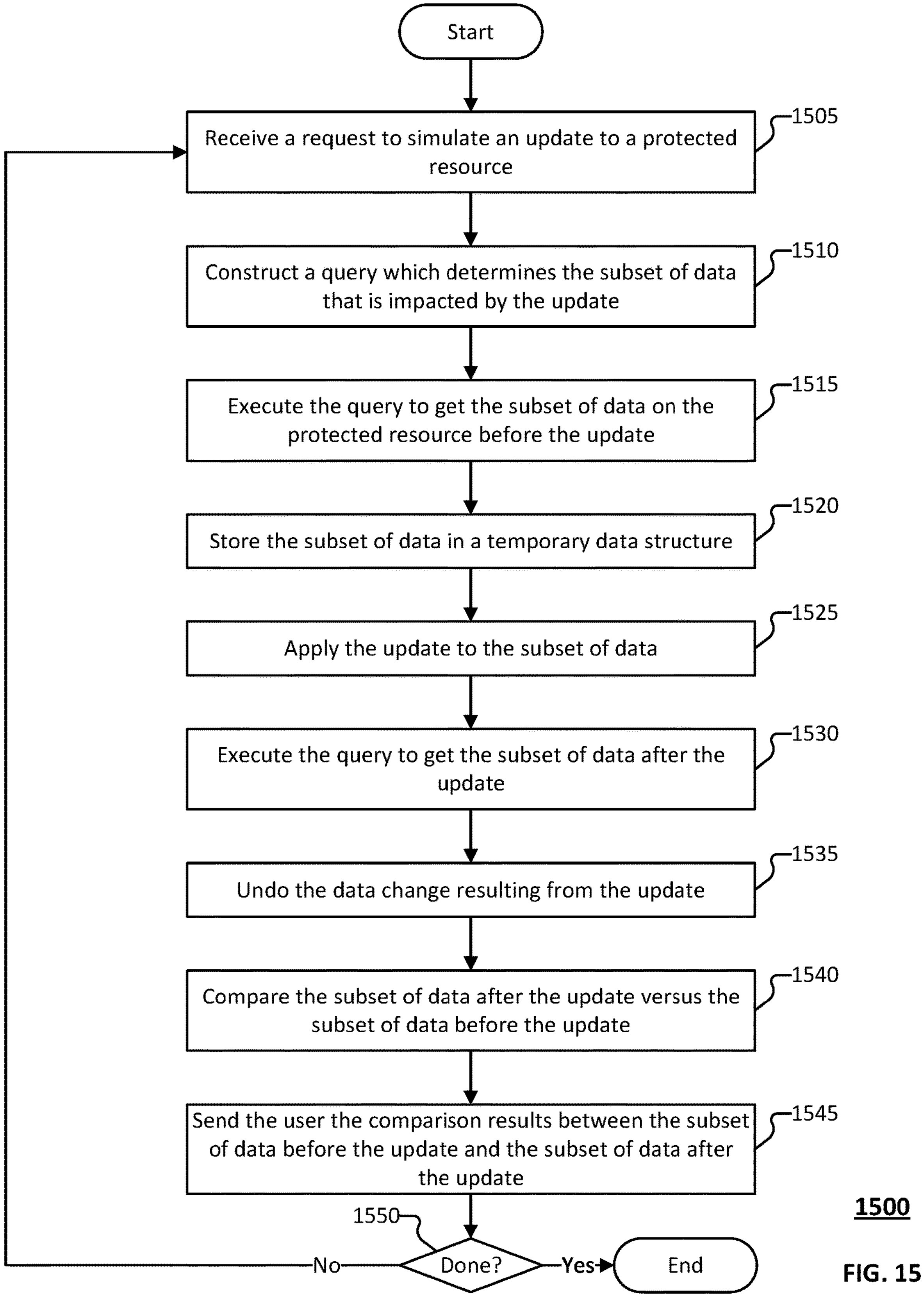
FIG. 15 is a flow diagram of a method for simulating an update to a protected resource according to various embodiments.

FIG. 15 is a flow diagram of a method for simulating an update to a protected resource according to various embodiments. In various embodiments, process 1500 is implemented at least in part by system 100 of FIG. 1, system 200 of FIG. 2, and/or system 300 of FIG. 3.

At 1505, the system receives a request to simulate an update to a protected resource. At 1510, the system constructs a query which determines the subset of data that is impacted by the update. At 1515, the system executes the query to obtain the subset of data on the protected resource before the update. At 1520, the system stores the subset of data in a temporary data structure. At 1525, the system applies the update to the subset of data. At 1530, the system executes the query to get the subset of data after the update. At 1535, the system undoes the data change resulting from the update. At 1540, the system compares the subset of data after the update versus the subset of data before the update. At 1545, the system sends the user the comparison results between the subset of data before the update and the subset of data after the update. In some embodiments, the user provides an instruction or indication to commit the update to the data stored in the protected resource. At 1550, a determination is made as to whether process 1500 is complete. In some embodiments, process 1500 is determined to be complete in response to a determination that no further access requests are to be processed, no further access requests are to mediated by a proxy service, no further updates are to be simulated, the update has been committed, the user has exited the system, an administrator indicates that process 1500 is to be paused or stopped, etc. In response to a determination that process 1500 is complete, process 1500 ends. In response to a determination that process 1500 is not complete, process 1500 returns to 1505.

Figure 16:
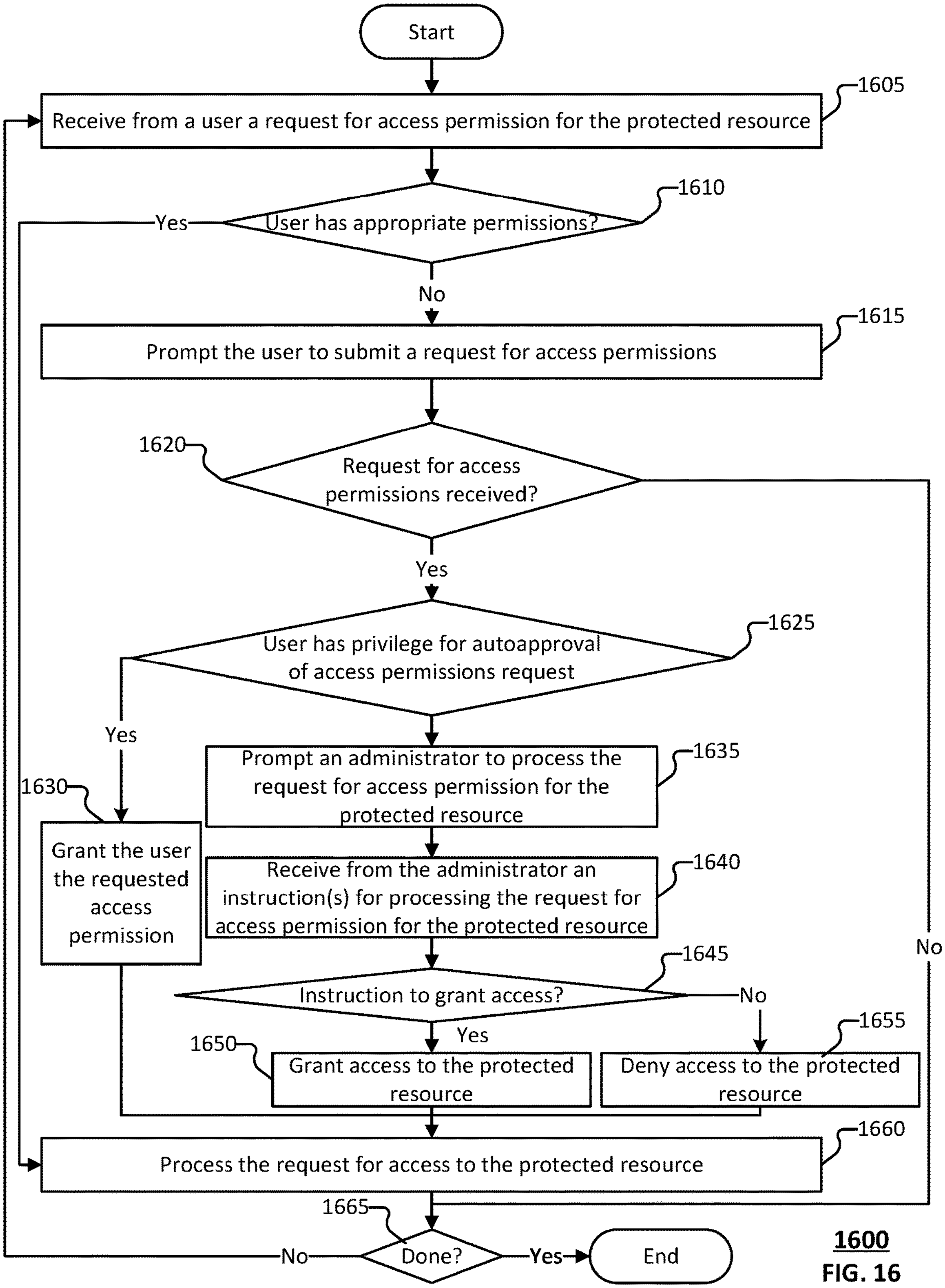
FIG. 16 is a flow diagram of a method for managing access to a protected resource according to various embodiments.

FIG. 16 is a flow diagram of a method for managing access to a protected resource according to various embodiments. In various embodiments, process 1600 is implemented at least in part by system 100 of FIG. 1, system 200 of FIG. 2, and/or system 300 of FIG. 3.

In some embodiments, process 1600 is implemented by one or more servers. Process 1600 may be implemented by a server that provides an access permission management service and/or a proxy service. For example, process 1600 is implemented by service 310 of system 300, PAAS service 315, or protected resource access service 170.

At 1605, the system receives from a user a request for an access permission(s) for the protected resource.

At 1610, the system determines whether the user has appropriate permissions. For example, the system determines whether the user has existing/valid permissions to access the protected resource. In response to determining that the user has appropriate permissions, process 1600 proceeds to 1650. Conversely, in response to determining that the user does not have appropriate permissions to access the protected resource, process 1600 proceeds to 1610 at which the system prompts the user to submit a request for access permissions. The system can receive the request for access permissions or parameters for the access permissions being requested based on user input to a user interface provided by the system.

At 1620, the system determines whether a request for access permissions has been received. In response to determining that the request for access permissions has not been received, process 1600 proceeds to 1665. The system can determine that the request for access permissions has not been received based on determining that the system has not received a request for access permissions within a predefined time period (e.g., a predefined timeout period) after the system prompted the user to submit the request for access permissions. In response to determining that the system received the request for access permissions, process 1600 proceeds to 1625.

At 1625, the system determines whether the user has a privilege for auto-approval of access permissions requests. For example, administrator, protected resource owners, or superusers can have auto-approval privileges. In response to determining that the user has the privilege for auto-approval of access permissions requests, process 1600 proceeds to 1630 at which the system grants the user the requested access permission. For example, the system automatically grants the user the requested access permission without further human input/approval. Conversely, in response to determining that the user does not have the privilege for auto-approval of access permissions, process 1600 proceeds to 1635.

At 1635, the system prompts an administrator to process the request for access permission for the protected resource. In response to receiving the access permissions request, the system can send an indication to the administrator/owner of the protected resource that an access permissions request is received and that the approve/deny input is required. The system can send the indication via a communication tool (e.g., MS Teams, Slack, Confluence, etc.) or by updating a web page with the pending permissions requests.

At 1640, the system receives from the administrator an instruction(s) for processing the request for access permission for the protected resource.

At 1645, the system determines whether an instruction to grant access is received. In response to determining that the instruction to grant access is received, process 1600 proceeds to 1650 at which the system grants access to the protected resource. Conversely, in response to determining that the instruction to grant access is not received, process 1600 proceeds to 1655 at which the system denies access to the protected resource. In some embodiments, denying access to the protected resource comprises blackholing the request, deleting the request, or otherwise taking no action with respect to the request.

At 1660, the system processes the request for access to the protected resource. For example, the system invokes process 1700.

At 1665, a determination is made as to whether process 1600 is complete. In some embodiments, process 1600 is determined to be complete in response to a determination that no further access requests are to be processed, no further access requests are to be mediated by a proxy service, an administrator indicates that process 1600 is to be paused or stopped, etc. In response to a determination that process 1600 is complete, process 1600 ends. In response to a determination that process 1600 is not complete, process 1600 returns to 1605.

Figure 17:
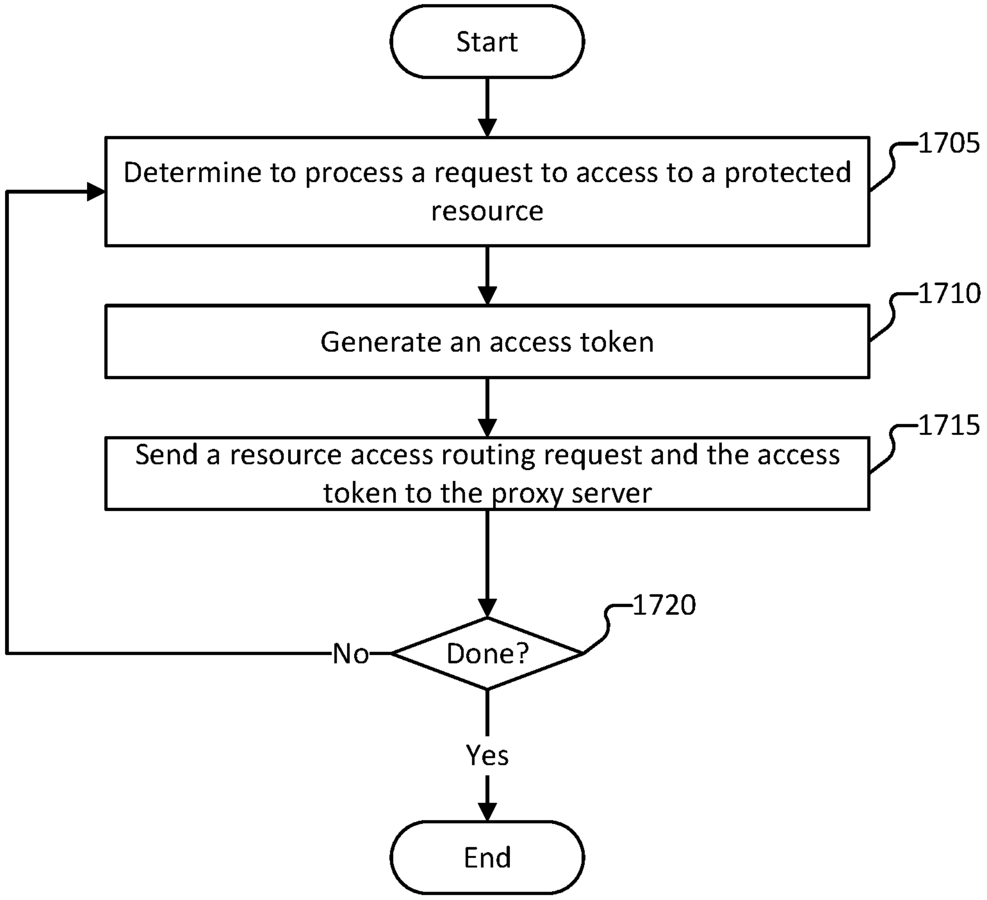
FIG. 17 is a flow diagram of a method for processing a request to access a protected resource according to various embodiments.

FIG. 17 is a flow diagram of a method for processing a request to access a protected resource according to various embodiments. In various embodiments, process 1700 is implemented at least in part by system 100 of FIG. 1, system 200 of FIG. 2, and/or system 300 of FIG. 3.

In some embodiments, process 1700 is implemented by one or more servers. Process 1700 may be implemented by a server that provides an access permission management service and/or a proxy service. For example, process 1700 is implemented by service 310 of system 300, PAAS service 315, or protected resource access service 170.

Process 1700 may be invoked by another system or service, such as a service implementing process 1600. For example, 1700 is invoked by 1650 of process 1600.

At 1705, the system determines to process a request to access a protected resource. At 1710, the system generates an access token. The access token is a JWT and may be configured with an expiry date according to the user's permissions with respect to the protected resource. At 1715, the system sends a resource access routing request and the access token to the proxy server. The proxy server may be a service running on the one or more servers implementing process 1700. At 1720, a determination is made as to whether process 1700 is complete. In some embodiments, process 1700 is determined to be complete in response to a determination that no further access requests are to be processed, no further access requests are to be mediated by a proxy service, an administrator indicates that process 1700 is to be paused or stopped, etc. In response to a determination that process 1700 is complete, process 1700 ends. In response to a determination that process 1700 is not complete, process 1700 returns to 1705.

Figure 18:
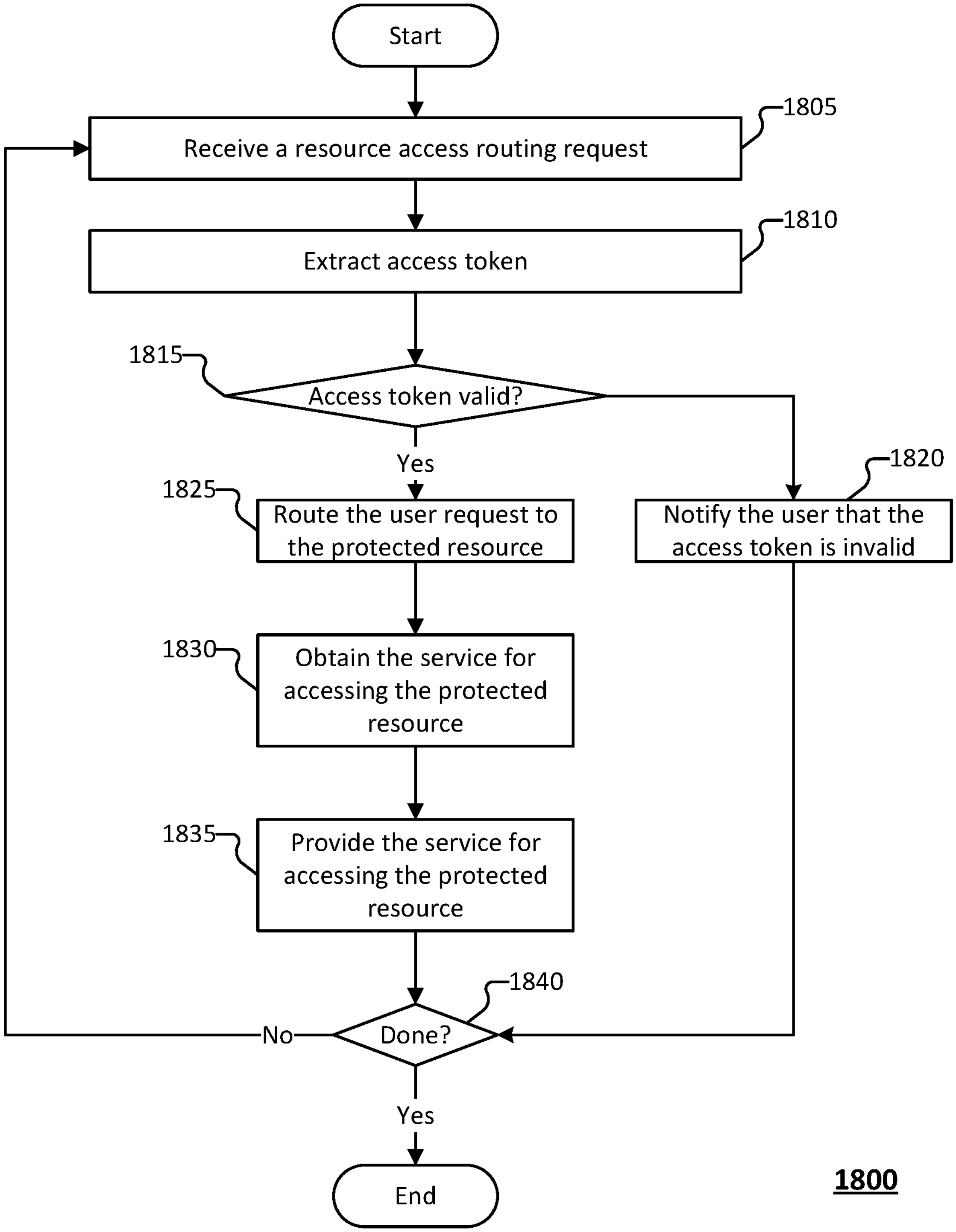
FIG. 18 is a flow diagram of a method for providing a proxy service for accessing a protected resource according to various embodiments.

FIG. 18 is a flow diagram of a method for providing a proxy service for accessing a protected resource according to various embodiments. In various embodiments, process 1800 is implemented at least in part by system 100 of FIG. 1, system 200 of FIG. 2, and/or system 300 of FIG. 3.

In some embodiments, process 1800 is implemented by one or more servers. Process 1800 may be implemented by a server that provides a proxy service for accessing protected resources. For example, process 1800 is implemented by service 310 of system 300, PAAS service 315, or protected resource access service 170.

Process 1800 may be invoked by another system or service, such as a service implementing process 1800. For example, 1800 is invoked by 1650 of process 1800.

At 1805, the system receives a resource access routing request. For example, the system receives the resource access routing request sent at 1715.

At 1810, the system extracts the access token comprised in, or sent in connection with, the resource access routing request. The access token may be associated with a particular user and protected resource(s).

At 1815, the system determines whether the access token is valid. In some embodiments, the system determines whether the access token is valid based on a determination of whether the access token is authentic and a determination of whether the access token has not expired.

In response to determining that the access token is not valid, process 1800 proceeds to 1820 at which the system notifies the user that the access token is invalid. For example, the system configures a user interface displayed at the client system used by the user so that the user interface comprises a prompt or alert indicating that the access token is invalid.

Conversely, if the system determines that the access token is valid, process 1800 proceeds to 1825 at which the system routes the user request to the protected resource.

At 1830, the system obtains the service for accessing the protected resource. For example, the system receives a response to a query executed with respect to the protected resource.

At 1835, the system provides the service for accessing the protected resource. For example, the system forwards the received service to the user or client system from which the request to access the protected resource is received.

At 1840, a determination is made as to whether process 1800 is complete. In some embodiments, process 1800 is determined to be complete in response to a determination that no further access requests are to be processed, no further access requests are to be mediated by a proxy service, an administrator indicates that process 1800 is to be paused or stopped, etc. In response to a determination that process 1800 is complete, process 1800 ends. In response to a determination that process 1800 is not complete, process 1800 returns to 1805.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for granting just-in-time access to a protected resource, comprising:
- one or more processors configured to:
  - receive from a user a request for access permission for the protected resource;
  - prompt an administrator to process the request for access permission;
  - receive from the administrator an instruction for processing the request for access permission;
  - in response to determining that the instruction for processing the request is to grant access, grant the user access to the protected resource;
  - simulate an update to the protected resource before committing the update based at least in part on determining a portion of the protected resource expected to be impacted, storing the portion in a temporary data structure, applying the update to the stored portion, and providing a representation of the portion before and after the update to the user or another user for review;
  - commit the update to the protected resource in response to receiving an instruction confirming the update; and
- a memory coupled to the one or more processors and configured to provide the one or more processors with instructions.

2. The system of claim 1, wherein the request for access permission for the protected resource is an HTTPS request.

3. The system of claim 1, wherein the request for access permission for the protected resource is received from a web browser running on a client system.

4. The system of claim 1, wherein granting the user access permission for the protected resource includes setting an expiration the user's permitted use of the protected resource.

5. The system of claim 1, wherein the protected resource is a database.

6. The system of claim 1, wherein the protected resource is a cluster of virtual machines.

7. The system of claim 1, wherein granting the user access permission for the protected resource comprises generating a token with which the user accesses the protected resource.

8. The system of claim 7, wherein the token is a JSON Web Token (JWT).

9. The system of claim 1, wherein the one or more processors are further configured to:
- receive from the user a request to access the protected resource;
- send the request to access the protected resource to an access agent for the protected resource; and
- in response to the access agent validating the user, providing the user with access to the protected resource.

10. The system of claim 9, wherein:
- granting the user access to the protected resource comprises generating a token with which the user accesses the protected resource; and
- the token is sent in connection with the request to access the protected resource.

11. The system of claim 10, wherein validating the user comprises validating the token.

12. The system of claim 9, wherein the one or more processors are further configured to:
- in response to receiving the request for access permission for the protected resource, log the request to access the protected resource.

13. The system of claim 1, wherein the one or more processors are further configured to:
- store in a log an indication of the user's actions taken with respect to the protected resource.

14. The system of claim 1, wherein the log is searchable based at least in part on a particular user or a particular resource.

15. The system of claim 1, wherein user provisioning for granting the user access to the protected resource is performed contemporaneous with receipt of the request for access to the protected resource.

16. The system of claim 1, wherein the one or more processors are further configured to:

simulate an update to the protected resource before the update is committed.

17. The system of claim 1, wherein simulating the update comprises providing to the user data associated with the protected resource before and after the update.

18. The system of claim 1, wherein simulating the update comprises providing to another user data associated with the protected resource before and after the update.

19. The system of claim 1, wherein the one or more processors are further configured to:

serve as a proxy for the user's access to the protected resource based at least in part on receiving an access request from the user, forwarding the access request to a service providing the protected resource, receiving a response from the service, and forwarding the response to the user; and log information pertaining to the access request or actions performed by the user with respect to the protected resource, wherein the log is searchable based at least in part on the user or the protected resource.

20. The system of claim 1, wherein the request for access permission is received from a web browser running on a client system associated with the user, and granting the user access enables the user to access the protected resource directly from the web browser without installing additional tools on the client system.

21. A method for granting just-in-time access to a protected resource, comprising:

receiving from a user a request for access permission for the protected resource;

prompting an administrator of the protected resource to process the request for access permission;

receiving from the administrator an instruction for processing the request for access permission;

in response to determining that the instruction for processing the request is to grant access, granting the user access to the protected resource;

simulating an update to the protected resource before committing the update based at least in part on determining a portion of the protected resource expected to be impacted, storing the portion in a temporary data structure, applying the update to the stored portion, and providing a representation of the portion before and after the update to the user or another user for review; and committing the update to the protected resource in response to receiving an instruction confirming the update.

22. A computer program product embodied in a non-transitory computer readable medium for granting just-in-time access to a protected resource, and the computer program product comprising computer instructions for:

receiving from a user a request for access permission for the protected resource;

prompting an administrator of the protected resource to process the request for access permission;

receiving from the administrator an instruction for processing the request for access permission;

in response to determining that the instruction for processing the request is to grant access, granting the user access to the protected resource;

simulating an update to the protected resource before committing the update based at least in part on determining a portion of the protected resource expected to be impacted, storing the portion in a temporary data structure, applying the update to the stored portion, and providing a representation of the portion before and after the update to the user or another user for review; and committing the update to the protected resource in response to receiving an instruction confirming the update.

* * * * *